US012421097B2

(12) United States Patent
Pettipher et al.

(10) Patent No.: US 12,421,097 B2
(45) Date of Patent: Sep. 23, 2025

(54) DISPENSER SYSTEM AND METHOD OF USE

(71) Applicant: EBAR INITIATIVES LTD, Aberdeen (GB)

(72) Inventors: Samuel Pettipher, Aberdeen (GB); Nicholas Beeson, Aberdeen (GB); Daniel Godfrey, Aberdeen (GB); Nicholas Earl, Aberdeen (GB); Clive Edmonds, Aberdeen (GB); Keith Brookes, Aberdeen (GB); Kyle O'Callaghan, Aberdeen (GB)

(73) Assignee: EBAR INITIATIVES LTD, Aberdeen (GB)

( * ) Notice: Subject to any disclaimer, the term of this patent is extended or adjusted under 35 U.S.C. 154(b) by 0 days.

(21) Appl. No.: 18/204,708

(22) Filed: Jun. 1, 2023

(65) Prior Publication Data

US 2023/0303380 A1 Sep. 28, 2023

Related U.S. Application Data

(62) Division of application No. 16/980,106, filed as application No. PCT/GB2019/050679 on Mar. 12, 2019, now Pat. No. 11,702,330.

(30) Foreign Application Priority Data

Mar. 12, 2018 (GB) .................................... 1803936
Jan. 14, 2019 (GB) .................................... 1900467

(51) Int. Cl.
*B67D 1/08* (2006.01)
*B67D 1/04* (2006.01)
*B67D 1/12* (2006.01)

(52) U.S. Cl.
CPC ......... *B67D 1/0885* (2013.01); *B67D 1/0894* (2013.01); *B67D 1/1272* (2013.01); *B67D 1/0425* (2013.01); *B67D 2210/00068* (2013.01)

(58) Field of Classification Search
CPC .. B67D 1/1272; B67D 1/0894; B67D 1/0885; B67D 2210/00068; B67C 2003/2668
(Continued)

(56) References Cited

U.S. PATENT DOCUMENTS 668,303 A 2/1901 Beyer
1,965,246 A * 7/1934 Meyer ...................... B67C 3/10 141/147
(Continued)

FOREIGN PATENT DOCUMENTS

CN 105661218 B 11/2019
DE 9204678 U1 5/1995
(Continued)

OTHER PUBLICATIONS

International Search Report and Written Opinion dated Sep. 27, 2019 for PCT/GB2019/050679.
Translation of JP2005-112469 (Year:2005).

*Primary Examiner* — Timothy L Maust
(74) *Attorney, Agent, or Firm* — FisherBroyles, LLP

(57) ABSTRACT

The invention provides a system for dispensing a beverage into a container comprising at least one dispenser unit. The dispenser unit comprises at least one fluid port and a moveable seal member which is configured to form a sealing barrier between at least a portion of the container and the dispenser head.

21 Claims, 23 Drawing Sheets

(58) Field of Classification Search
USPC .................................................. 141/46, 57, 284
See application file for complete search history.

(56) References Cited

U.S. PATENT DOCUMENTS

| | | | | |
|---|---|---|---|---|
| 2,897,855 | A | 8/1959 | Vadas | |
| 3,783,912 | A * | 1/1974 | Friendship | B67C 3/2631 141/46 |
| 3,797,535 | A | 3/1974 | Kaiser | |
| 4,538,652 | A * | 9/1985 | Valentin | B67C 3/208 141/37 |
| 4,750,533 | A | 6/1988 | Yun | |
| 4,938,261 | A | 7/1990 | Petri et al. | |
| 5,042,536 | A | 8/1991 | Ulrich et al. | |
| 5,148,841 | A | 9/1992 | Graffin | |
| 5,634,500 | A | 6/1997 | Clusserath et al. | |
| 6,401,598 | B1 | 6/2002 | Tavlarides | |
| 6,761,191 | B2 * | 7/2004 | Rosen | B67C 3/005 141/144 |
| 7,353,850 | B2 * | 4/2008 | Greiwe | B67D 1/08 141/270 |
| 7,469,726 | B2 | 12/2008 | Clusserath et al. | |
| 7,533,701 | B2 * | 5/2009 | Gadzic | B67D 1/0009 141/54 |
| 7,980,380 | B2 | 7/2011 | Thielmann | |
| 2002/0019252 | A1 | 2/2002 | Kuroda | |
| 2002/0139434 | A1 | 10/2002 | Meheen | |
| 2010/0192521 | A1 | 8/2010 | Clusserath | |

FOREIGN PATENT DOCUMENTS

| | | | |
|---|---|---|---|
| FR | 1119310 | A | 1/1955 |
| FR | 1256724 | A | 2/1961 |
| JP | 2005112469 | A | 4/2005 |
| JP | A2015199546 | A | 11/2015 |
| KR | 1020090015172 | A | 2/2009 |
| WO | WO98/42613 | A2 | 10/1998 |
| WO | WO2012/123768 | A1 | 9/2012 |

* cited by examiner

DISPENSER SYSTEM AND METHOD OF USE

This application is a Divisional of U.S. patent application Ser. No. 16/980,106, filed Sep. 11, 2020, the contents of which is incorporated herein by reference.

FIELD OF THE INVENTION

The present invention relates to beverage dispensing and in particular to dispensing carbonated or effervescent beverages for consumption. Aspects of the invention relate to a system and method for rapidly dispensing carbonated or effervescent beverages into drinking containers.

BACKGROUND TO THE INVENTION

Beverages such as alcoholic and non-alcoholic carbonated drinks are purchased at entertainment venues including bars, arenas, cinemas, theatres and stadiums. These venues may accommodate thousands of people during an entertainment event requiring large volumes of beverages to be dispensed and sold in a short period of time.

Current beverage dispenser systems typically store carbonated or effervescent beverages in a pressurised keg or tank. The keg or tank is connected to a dispenser head and the beverage is dispensed manually by a skilled operator into a glass or cup. Alternatively, in post mixed systems water is carbonated and mixed with a flavoured syrup prior to it being dispensed. However, there are a number of problems and limitations of these systems for serving large volume of customers during entertainment events.

Due to the nature of the entertainment events, it is typical that a large number of customers will attempt to purchase beverages at the same time i.e. before the event or during a brief intermission period. This may result in the skilled operator attempting to dispense large number of drinks over a small timeframe. This puts pressure on the venue staff to handle large numbers of customers eager to receive their beverages quickly and return to enjoy the event.

Unfortunately, the current dispenser systems are unable to dispense quickly. Increasing the volumetric flow rate of these systems may result in excessive foaming of the fizzy beverage. This further slows down the dispensing of the beverage as the operator must either wait until the foaming has subsided or discard the beverage and dispense a replacement. This limits the speed which drinks may be dispensed and throughput of customers at any given time.

Some venues may attempt to address this problem by pre-pouring a large number of drinks during a low-demand quiet period before they are ordered in order to meet high-demand during busy periods. However, this approach affects the quality of the drinks as they may be contaminated as they wait to be sold. The dispensed drinks may also quickly become warm and flat reducing the consumers enjoyment and putting customers off paying for the drinks. This may have a negative impact on the reputation and profits of the venue and brewer or drinks brand.

Furthermore, producing large number of pre-poured drinks may result in storage area issues for the venue and may lead significant wastage if the drinks are not all sold.

SUMMARY OF THE INVENTION

It is an object of an aspect of the present invention to obviate or at least mitigate the foregoing disadvantages of prior art beverage dispenser systems.

It is an object of an aspect of the present invention to provide a robust and reliable beverage dispensing system capable of dispensing beverages rapidly and to a high quality.

It is a further object of an aspect of the present invention to provide a beverage dispensing system which may allow carbonated or fizzy beverages to be dispensed rapidly under counter pressure to mitigate or avoid excessive foaming of the beverage.

It is another object of an aspect of the present invention to provide a self-service beverage dispensing system which may allow a plurality of carbonated or fizzy beverages to be dispensed sequentially and/or simultaneously.

It is an object of an aspect of the present invention to provide a method of dispensing a carbonated or fizzy beverage rapidly without the formation of excessive foam within the beverage.

Further aims of the invention will become apparent from the following description.

According to a first aspect of the invention there is a system for dispensing a beverage into a container, the system comprising:

- at least one dispenser unit, the at least one dispenser unit comprising
- a dispenser head, wherein the dispenser head comprises:
- a beverage outlet;
- at least one pressure port and
- a moveable seal member which is configured to form a sealing barrier between at least a portion of the container and the dispenser head.

By providing a beverage dispensing system capable of forming a sealing barrier between the container and the dispenser head it may facilitate the creation of a differential pressure between an interior and exterior of the container to allow a beverage to be rapidly dispensed into the interior of the container.

Preferably the system or the at least one dispenser unit comprises at least one support member configured to support the container.

Preferably the at least one support member is configured to contact, hold, position and/or support the container at the mouth, lip and/or rim of the container. The at least one support member may be configured to contact an inner, outer and/or upper surface of the mouth, lip and/or rim of the container.

The at least one support member may be configured to contact, hold, position and/or support the container at the base or side of the container.

The at least one support may be configured to position and/or align the container with the moveable seal member to ensure an effective seal. The at least one support may be configured to position of the container to align the lip and/or rim of the container with the moveable seal member.

The at least one support member may be shaped and/or dimensioned to allow an inner, outer and/or upper surface of the mouth, lip and/or rim of the container to rest on the support member when the container is loaded or positioned in the dispenser unit.

By providing a system comprising a moveable seal member which is configured to form a sealing barrier between at least a portion of the container and the dispenser head the position of the container is not changed during the formation of sealing barrier, dispensing of the beverage and removal of the sealing barrier. This may avoid or mitigate agitation or spillage of the beverage.

The moveable seal member may be configured to be movable between a first condition in which the seal member is spaced from the container and a second condition in the sealing member is in contact with at least a portion of the container to form a sealing barrier.

The at least a portion of the container may be the mouth, lip and/or rim of the container. The sealing member may contact, grip and/or clamp an inner, outer or upper surface of the mouth, lip and/or rim of the container.

The seal member may comprise a sealing element. The sealing element may comprise a resilient and/or food safe material. The sealing element may be made of a material selected from the group comprising silicone, rubber, plastic or resin. Any suitable resilient and/or food safe material may be used.

By providing moveable seal member configured to contact, grip and/or clamp an inner, outer or upper surface of the mouth, lip and/or rim of the container the distance between the seal member at the first condition and the seal member at the second condition may be a short distance. This may allow the system to form a seal barrier quickly thereby saving time.

The seal member may be configured to move in a substantially vertical and/or horizontal direction. Preferably the seal member is configured to move in a generally vertical direction. The vertical distance between the first and second condition of the seal member may be in the range of approximately 2 mm to 200 mm. Preferably the distance between the first and second conation of the seal member may be in the range of approximately 10 mm to 15 mm.

By providing a moveable seal member configured to contact, grip and/or clamp an inner, outer or upper surface of the mouth, lip and/or rim of the container, the sealing force is applied and limited to a small area of the container. This avoid forces being applied to the entire container body.

The system may comprise a screen, door and/or splashguard. The screen, door and/or splashguard may isolate the container from the user during dispensing of the beverage. By isolating the user from the container during dispensing it mitigates safety risks to the user from moving parts or breaking containers. It also mitigates spillages or splashes. The limited access to the dispenser parts by the user also improves the hygiene of the dispenser.

The container may be selected from the group comprising: drinking vessels, bottles, mugs, cups, jugs, glasses, beakers, tumblers or tankards. The container may be made from a range of materials including hard or soft plastic, glass, ceramic, cardboard, paper, waxed paper or foam. The container may be disposable or reusable.

A volume of beverage to be dispensed may be a UK pint of 568 ml or a US pint of 473 ml. The volume of beverage to be dispensed may be a fraction of the UK or US pints. The volume of beverage to be dispensed may be adjustably set.

The beverage may be dispensed into the container in less than 10 seconds. Preferably the beverage may be dispensed into the container in less than 5 seconds. Further preferably the beverage may be dispensed into the container in less than 3 seconds.

The beverage may be a carbonated and/or fizzy beverage. The beverage may be alcoholic and/or non-alcoholic. Preferably the beverage is beer. The beer may be selected from the group comprising lager, ale, wheat beer, stout, porter and/or malt.

The pressure port may also act as the beverage outlet. A valve connected to the pressure port may control the medium that passes through the port.

By providing a system capable of forming a sealing barrier between the container and the dispenser head it may facilitate the dispensing of the beverage under counterpressure.

The at least one pressure port may be connected to at least one pressure source. The pressure source may be configured to create a pressure differential between the interior and exterior of the container. The interior pressure may be higher than the exterior pressure. The interior pressure may be maintained during the dispensing of the beverage to prevent oxidation or contamination of the product. For carbonated or fizzy beverages this may prevent loss of carbonation or bubbles from the beverage.

Preferably the beverage outlet is connected to at least one beverage source. The at least one beverage source may be pressurised or non-pressurised. The at least one beverage source may be a keg or storage tank.

The beverage source may be a two-part system where a first fluid such as water is carbonated in a carbonator and is mixed with a second fluid such as a syrup prior to dispense.

The beverage outlet may be connected to a dip tube and/or nozzle. The dip tube and/or nozzle may be short or extend to the bottom of the container. The dip tube and/or nozzle may be straight or angled to the side of the container, The nozzle may have a generally conical shape. The nozzle may comprise a plurality of fluid conveyancing channels on its surface. The channels may be shaped and dimensioned to convey and/or direct the beverage to contact the internal surface of the container.

The at least one pressure source may be a gas supply. Preferably the at least one pressure source is configured to form a pressure differential between an internal and external volume of the container when the seal member is in the second condition.

The gas supply may be selected from the group comprising: an inert gas, air, carbon dioxide and/or a mixture of gases.

The moveable seal member may be connected to an actuator configured to move the seal member between the first and second conditions.

Preferably the seal member is mounted on the dispenser head. The dispenser head may be movable to move the seal member. Preferably the dispenser head may be movable in a generally vertical direction to move the seal member in a generally vertical direction. The seal member and/or dispenser head are movable relative to the at least one support member. The seal member and/or dispenser head are movable in a generally vertical direction relative to the at least one support member and/or a container supported by the at least one support member.

The system may comprise a plurality of support members. A first support member may be configured to contact and/or hold the container at the mouth, lip and/or rim of the container and a second support member may be configured to contact and/or hold a side and/or base of the container.

The base support member may be removably mountable on the dispenser. A plurality of base support members of differing dimensions and/or shapes may be provided to adjust the height and/or position of a container in the dispenser. By selecting an appropriate base support to match the container shape and size the container may be raised or lowered to ensure that the dispenser head can effect an effective seal with the container. Therefore, a range of different container shapes and sizes may be used in the dispenser.

The base support member maybe made of any suitable material that can support a container. Preferably the base support member is made of a transparent, translucent or semi-opaque material. The base support member may be made of plastic or glass.

The base support may allow light to the transmitted through its structure. Different colours of light may be transmitted by the dispenser system through the base support to indicate the status of the dispensing operation.

The system may comprise a control unit. The control unit may be configured to control the movement of the dispenser head and/or the seal member. The control unit may be configured to control the pumping of the beverage through the beverage outlet. The control unit may be configured to control the pressurising of the container through the at least one pressure port. The control unit may be configured to control the venting of gas and excess beverage from the container through the at least one pressure port.

The system may include sensors to monitor beverage dispenser performance and allow 'real-time' adjustment of dispensing parameters. The parameters may include flow rate, pumping rates, flow/pumping times, container threshold counter-pressures and cooler parameters such as temperature. By providing control of the dispensing parameters carbonation levels, temperature and/or foam 'head' height may be maintained within desired parameters or tailored to a user's preference.

The container may be manually or automatically loaded into the dispensing device. Automated loading may be controlled by the control unit to allow placement of beverage containers without user intervention.

The control unit may be programmed to facilitate safe, automatic operation of the beverage dispensing unit. The control unit may be programmed to actuate safety locks to prevent access to and/or release of the container during dispensing. The control unit may issue instructions to various components of the dispensing system and monitor output from a variety of sensors (pressure, temperature, flow, proximity).

The control unit may comprise a simple board programmed by a remote computer. Alternatively, programming may be performed remotely through a network to the local computer unit installed within the beverage dispenser.

The control unit may be configured to monitor the number of beverages dispensed during a cycle and has the capability to shut down the dispensing operation when it calculates that the beverage source has reached a lower volume threshold limit after which further dispensing may result in no or poor-quality beverage.

The control unit may be connected to computer devices which provide instructions and receive instructions to/from users (customers).

The control unit may be configured to open the door (if present) to automatically present the dispensed beverage to the user/customer.

Preferably the system is a self-service system. The loading of the container, dispensing of the beverage and presenting of the dispensed beverage are automated.

According to a second aspect of the invention there is a system for dispensing a beverage into a container, the system comprising:

at least one dispenser unit, the at least one dispenser unit comprising at least one support member configured to support the container and a dispenser head, wherein the dispenser head comprises:

- a beverage outlet;
- at least one pressure port
- a moveable seal member which is configured to move between a first condition in which the seal member is spaced from the container and a second condition in the sealing member is in contact with at least a portion of the container to form a sealing barrier.

Embodiments of the second aspect of the invention may include one or more features of the first aspect of the invention or its embodiments, or vice versa.

According to a third aspect of the invention there is provided a system for dispensing a beverage into a container, the system comprising:

- at least one dispenser unit, the at least one dispenser unit comprising
- at least one support member configured to support the container and
- a movable dispenser head, wherein the dispenser head comprises:
- a beverage outlet;
- at least one pressure port and
- a seal member;
- wherein the dispenser head is movable between a first condition in which the seal member is spaced from the container and a second condition in the sealing member is in contact with at least a portion of the container.

Preferably the at least one pressure source is configured to form a differential pressure between an internal and external volume of the container the dispenser head is in the second condition.

Preferably the seal member is mounted on the dispenser head. The dispenser head may be movable to move the seal member. The seal member and/or dispenser head are movable relative to the at least one support member.

Embodiments of the third aspect of the invention may include one or more features of the first or second aspects of the invention or its embodiments, or vice versa.

According to a fourth aspect of the invention there is provided a system for dispensing a beverage into a container, the system comprising:

- at least one support member configured to support a container;
- at beverage outlet;
- at least one pressure source and
- a moveable seal member which is movable between a first condition in which the seal member is spaced from the container and a second condition in the sealing member is in contact with a rim, upper edge or inner edge of the container to form a sealing barrier;
- wherein the at least one pressure source is configured to form a differential pressure between an internal and external volume of the container when a sealing barrier is formed.

Embodiments of the fourth aspect of the invention may include one or more features of the first, second or third aspects of the invention or their embodiments, or vice versa.

According to a fifth aspect of the invention there is a system for dispensing a beverage into a container, the system comprising:

- a support frame comprising a plurality of dispenser units;
- wherein each dispenser unit comprises
- at least one support member configured to support the container;
- a dispenser head comprising a beverage outlet and at least one pressure port; and
- a moveable seal member which is configured to form a sealing barrier between at least a portion of the container and the dispenser head.

Embodiments of the fifth aspect of the invention may include one or more features of the first to fourth aspects of the invention or their embodiments, or vice versa.

According to a sixth aspect of the invention there is provided a system for dispensing a carbonated or fizzy beverage into a container, the system comprising:

at least one dispenser unit, the dispenser unit comprising at least one support member configured to support the container and a dispenser head, wherein the dispenser head comprises:

a beverage outlet;

a seal member which is movable between a first condition in which the seal member is spaced from the container and a second condition in the sealing member is in contact with a rim, upper edge or inner edge of the container to form a sealing barrier; and at least one pressure port configured to form a differential pressure between an internal volume and an external volume of the container.

Embodiments of the sixth aspect of the invention may include one or more features of the first to fifth aspects of the invention or their embodiments, or vice versa.

According to a seventh aspect of the invention there is provided a method of dispensing a beverage into a container, the method comprising:

providing a beverage dispenser system comprising at least one dispenser unit, the at least one dispenser unit comprising at least one support member;

a dispenser head, wherein the dispenser head comprises:

a beverage outlet;

at least one pressure port and a seal member;

supporting a container using the at least one support member;

moving the seal member to contact at least a portion of the container to form a sealing barrier between the dispenser head and the container;

pressuring an interior volume of the container with a gas and pumping the beverage into the interior volume of the container through the beverage outlet.

The method may comprise venting or removing pressurised gas from the interior volume of the container while the beverage is pumped into the container. The method may comprise venting or removing pressurised gas through the at least one pressure port.

The method may comprise venting or removing pressurised gas from the interior volume of the container after the beverage has been pumped into the container.

The gas may be selected from the group comprising: an inert gas, air, carbon dioxide and/or a mixture of gases.

The at least a portion of the container may be the mouth, lip and/or rim of the container. The sealing member may contact, grip and/or clamp an inner, outer or upper surface of the mouth, lip and/or rim of the container.

The method may comprise moving the seal member by moving the dispenser head. The method may comprise moving the seal member away from the rim, upper edge or inner edge of the container to break the sealing barrier between the dispenser head and the container after the beverage is pumped into the container.

The method may comprise pressuring an interior volume of the container to form a pressure differential between the internal and external volume of the container.

The method may comprise increasing the pressure in the container above atmospheric pressure prior to pumping the beverage into the container. The method may comprise reducing the pressure in the container to atmospheric pressure during or after pumping the beverage into the container.

The method may comprise dispensing the beverage in less than 10 seconds. Preferably the method may comprise dispensing the beverage in less than 5 seconds. Further preferably the method may comprise dispensing the beverage in less than 3 seconds.

The beverage dispenser system may be a self-service system. The steps of the method may be automated. The automated steps may be controlled by a control unit.

Embodiments of the seventh aspect of the invention may include one or more features of any of the first to sixth aspects of the invention or their embodiments, or vice versa.

According to an eighth aspect of the invention there is provided a method of dispensing a carbonated or fizzy beverage into a container, the method comprising:

providing a beverage dispenser system comprising at least one dispenser unit, the dispenser unit comprising at least one support member;

a dispenser head, wherein the dispenser head comprises:

a beverage outlet;

at least one pressure port; and a seal member;

mounting a container on the at least one support member;

moving the dispenser head to contact the seal member with a rim, upper edge or inner edge of the container to form a sealing barrier between the dispenser head and the container;

pressurising an interior volume of the container with a gas and pumping the beverage into the interior volume of the container through the beverage outlet.

Embodiments of the eighth aspect of the invention may include one or more features of any of the first to seventh aspects of the invention or their embodiments, or vice versa.

According to a ninth aspect of the invention there is provided a method of dispensing a carbonated or fizzy beverage into a container, the method comprising:

providing a beverage dispenser system comprising at least one dispenser unit, the at least one dispenser unit comprising at least one support member;

a dispenser head, wherein the dispenser head comprises:

a beverage outlet;

at least one pressure port; and a seal member;

supporting a container using the at least one support member;

moving the dispenser head to contact the seal member with a rim, upper edge or inner edge of the container to form a sealing barrier between the dispenser head and the container;

pressuring an interior volume of the container with a gas and pumping the beverage into the interior volume of the container through the beverage outlet.

Embodiments of the ninth aspect of the invention may include one or more features of any of the first to eighth aspects of the invention or their embodiments, or vice versa.

According to a tenth aspect of the invention there is provided a method of dispensing a carbonated or fizzy beverage into a plurality of containers, the method comprising: providing a beverage dispenser system comprising plurality of dispenser units, wherein each dispenser unit comprises at least one support member configured to support the container and a dispenser head, wherein the dispenser head comprises:

a beverage outlet;

at least one pressure port; and a seal member;

mounting a first container on a first dispenser unit;

moving the seal member to contact at least a portion of the first container to form a sealing barrier between the dispenser head and the first container;

pressuring an interior volume of the first container with a gas; and pumping the beverage into the interior volume of the first container through the beverage outlet.

The method may comprise repeating the steps to dispense the beverage into a second or further container. The method may comprise dispensing the beverage into a second container using the first dispenser unit subsequent to the first container being filled. The method may comprise dispensing the beverage into a second container using a second dispenser subsequently or simultaneously to the first dispenser unit dispensing into the first container.

The at least a portion of the container may be the mouth, lip and/or rim of the container. The sealing member may contact, grip and/or clamp an inner, outer or upper surface of the mouth, lip and/or rim of the container.

Embodiments of the tenth aspect of the invention may include one or more features of any of the first to ninth aspects of the invention or their embodiments, or vice versa.

According to an eleventh aspect of the invention there is a system for dispensing a beverage into a container, the system comprising:

at least one support member configured to support the container and at least one a dispenser head, wherein the at least one dispenser head comprises at least one moveable seal member which is configured to form a sealing barrier between at least a portion of the container and the at least one dispenser head.

Embodiments of the eleventh aspect of the invention may include one or more features of any of the first to tenth aspects of the invention or their embodiments, or vice versa.

According to a twelfth aspect of the invention there is provided a method of dispensing a beverage into a container, the method comprising:

providing a beverage dispenser system comprising at least one support member at least one a dispenser head, wherein the at least one dispenser head comprises at least one seal member.

supporting a container using the at least one support member;

moving the seal member to contact at least a portion of the container to form a sealing barrier between the dispenser head and the container;

pressuring an interior volume of the container with a gas and pumping the beverage into the interior volume of the container through the beverage outlet.

Embodiments of the twelfth aspect of the invention may include one or more features of any of the first to eleventh aspects of the invention or their embodiments, or vice versa.

According to a thirteenth aspect of the invention there is a system for dispensing a beverage into a container, the system comprising:

at least one dispenser unit, the at least one dispenser unit comprising a dispenser head, wherein the dispenser head comprises:

at least one fluid port; and a moveable seal member which is configured to form a sealing barrier between at least a portion of the container and the dispenser head.

The at least one fluid port is preferably a beverage outlet and/or pressure port. A valve may be connected to the at least one fluid port to control whether the fluid port acts as a beverage outlet and/or a pressure port. The valve may be operated between a first condition where the fluid port is a pressure port and a second condition where the fluid port is a beverage outlet.

The system may comprise at least one support member configured to support the container.

Embodiments of the thirteenth aspect of the invention may include one or more features of any of the first to twelfth aspects of the invention or their embodiments, or vice versa.

BRIEF DESCRIPTION OF THE DRAWINGS

There will now be described, by way of example only, various embodiments of the invention with reference to the drawings, of which.

Figure 1:
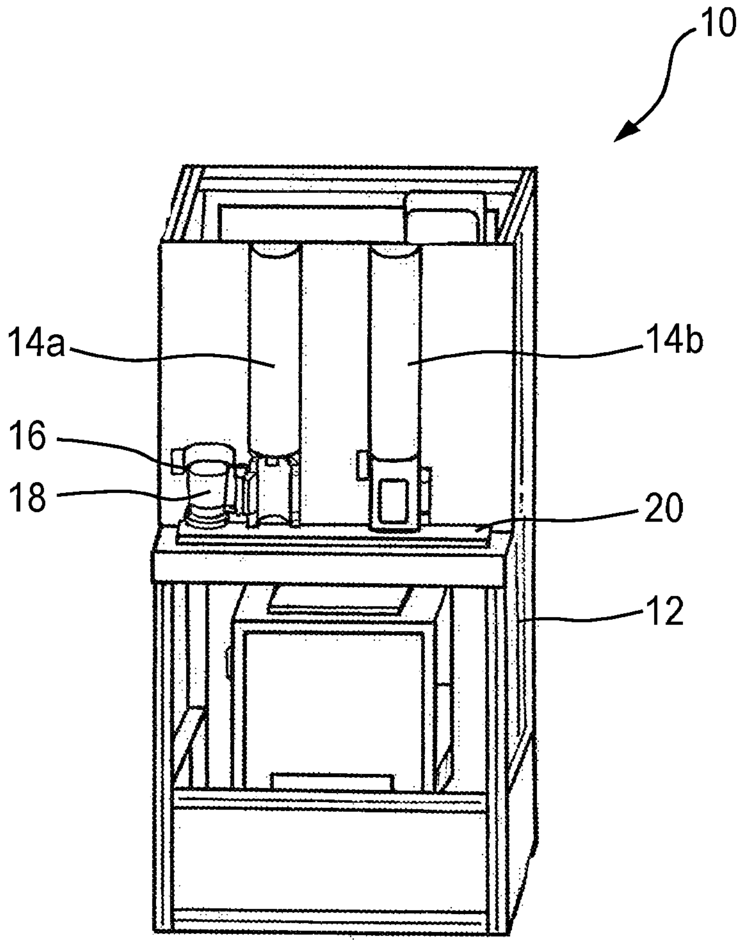
FIG. 1 presents a dispenser system in accordance with an embodiment of the invention shown in a perspective view.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION OF PREFERRED EMBODIMENTS

FIG. 1 shows a dispenser system 10. The system has a main dispenser body 12, with two dispensers 14*a* and 14*b* shown. The dispenser has a drip tray 20 located below the dispensers 14*a* and 14*b*. Each dispenser has a container support 16. The support 16 is configured to retain and support a container 18 for dispensing a beverage into the container. Although in FIG. 1 only two dispensers 14*a* and 14*b* are shown, the system may comprise a plurality of dispensers in main dispenser body 12.

Figure 2A:
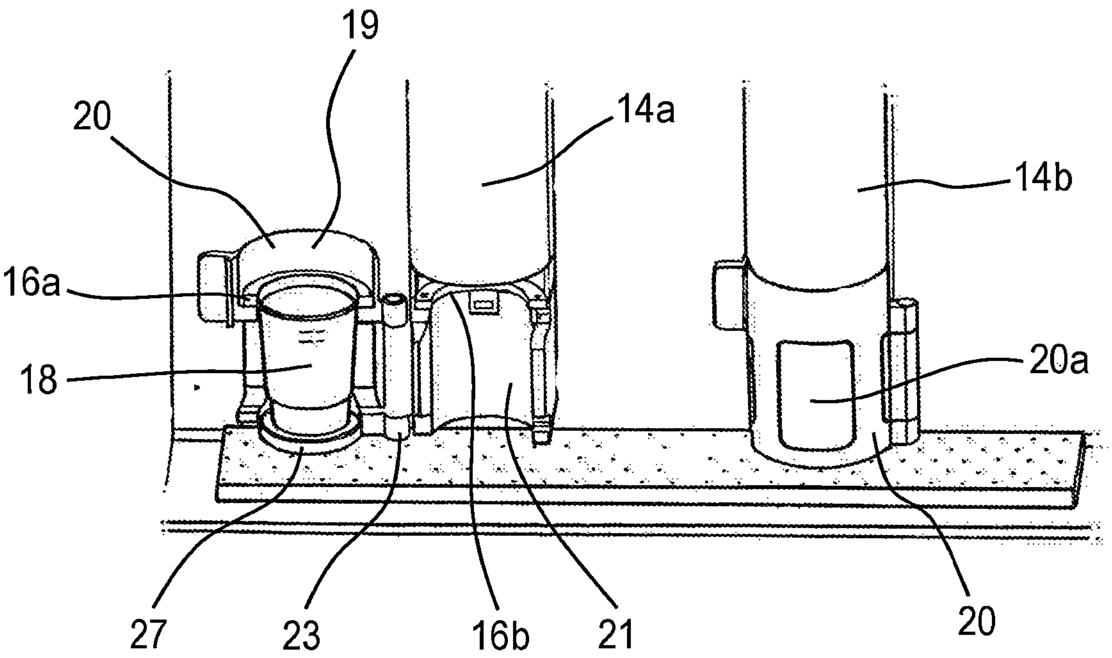
FIGS. 2A to 2F present components of the dispenser apparatus of the dispenser system of FIG. 1 shown in perspective and enlarged views.

In this example the support 16 is split into two semi-circular halves 16*a*, 16*b* as shown best in FIGS. 2A to 2D. In this clamshell support design, the first half 16*a* of the support 16 is mounted on an inner surface 19 of a hinged door 20. The second half 16*b* of the support 16 is mounted on a wall 21 of the dispenser 14*a*, 14*b*. The door is connected the dispenser body 12 by hinges 23. The door 20 has a window 20*a* to allow the filling of the container to be monitored. Optionally a base plate 27 may be located on the door or the dispenser to provide additional support to the container. FIG. 2A shows one of the dispensers 14*a* with the door 20 in an open condition and the other dispenser 14*b* with the door 20 in a closed condition.

Figure 2B:
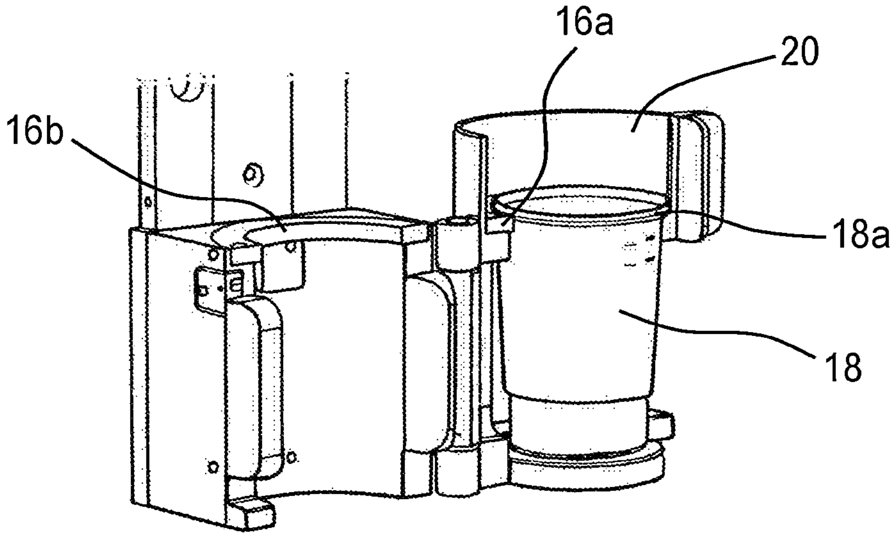
Figure 2C:
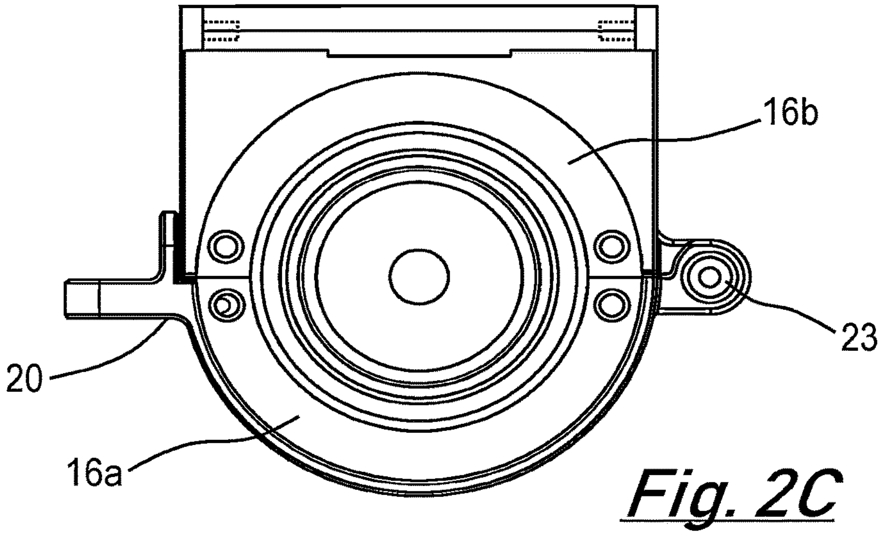
Figure 2D:
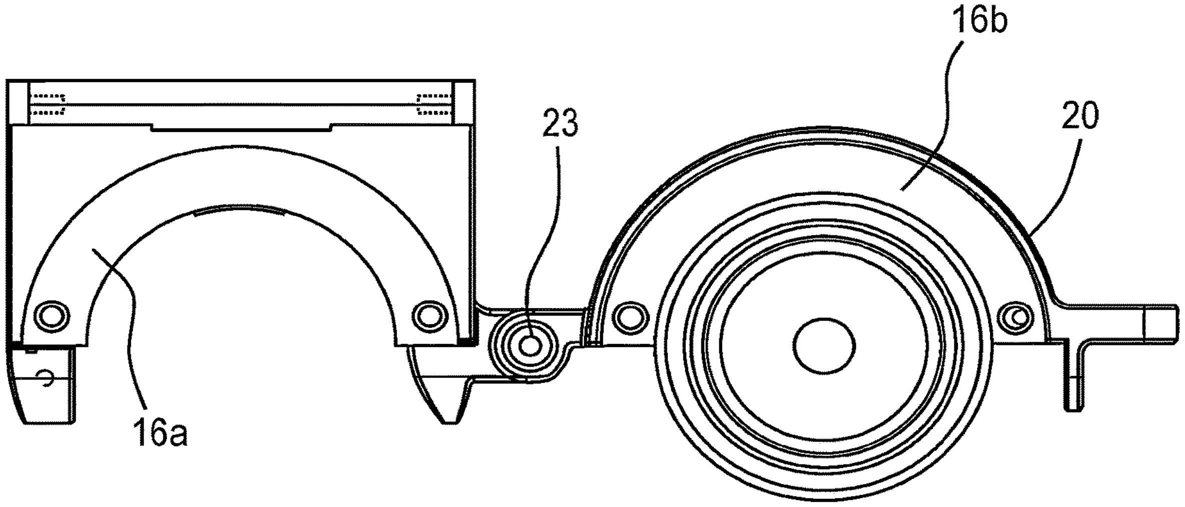
Figure 2E:
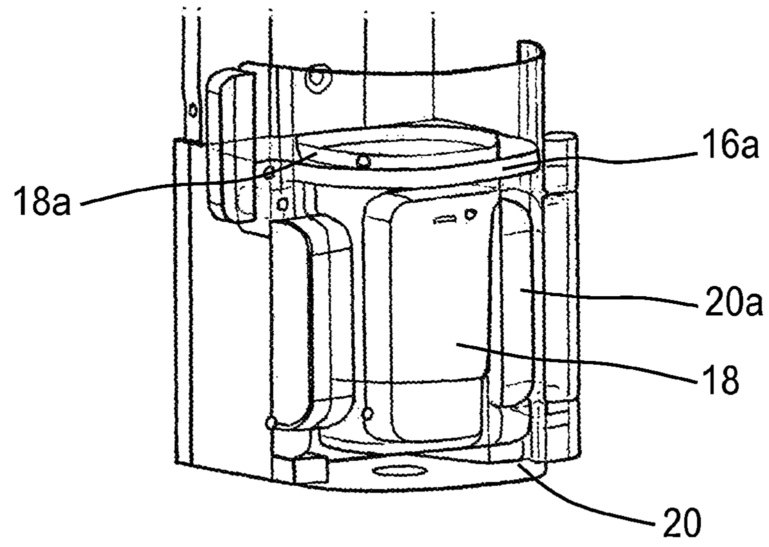

As shown in FIGS. 2B and 2D, an upper edge or rim 18*a* of the container is partially supported by the first half 16*a* of the support 16 when the hinged door 20 is in an open position. When the door is closed as shown in FIG. 2C (overhead view) and 2E the first half 16*a* and second half 16*b* of the support meet to form circular support 16 which surrounds the circumference of the rim of the container and fully supports the upper edge or rim of the container. The supporting element 16 runs continuously along the entire circumference of the rim of the container. The door 20 in FIG. 2E is shown as transparent for clarity.

Figure 2F:
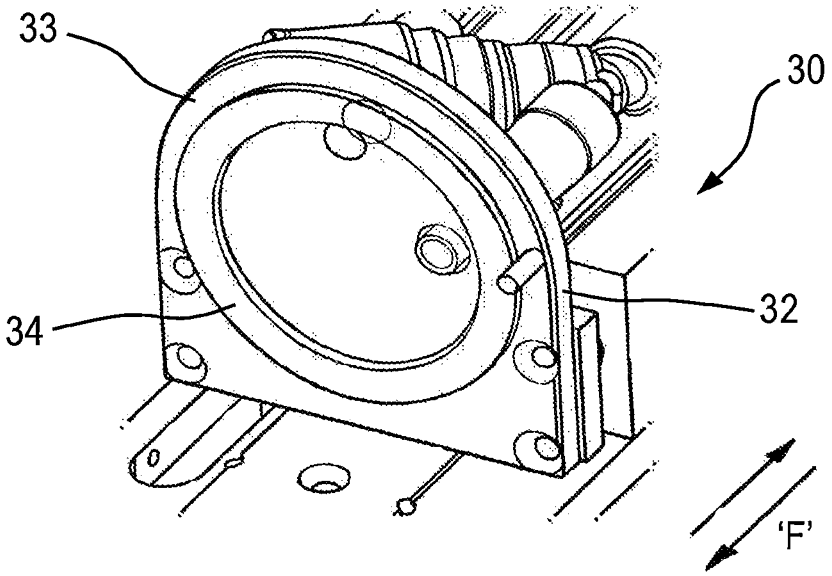

FIG. 2F shows the perspective view of the underside of a dispenser head manifold 30 which is designed to be lowered and raised in a vertical direction along arrows "F" relative to the upper edge or rim 18*a* of the container 18. The dispenser head 30 comprises a sealing plate 32 which has a sealing element 34 on a section of the sealing plate 32. In this example the section of the sealing plate 32 is on an underside surface 33.

The sealing element 34 is designed and dimensioned to form a sealing barrier when it is pressed in contact with and/or clamped against the support 16 and/or the upper edge, inner edge or rim 18*a* of the container 18. In this example the sealing element 34 is made of a resilient material such as silicone or rubber and has a flat sealing surface.

The sealing element 34 is designed to maintain a pressure differential between the interior and exterior of the container when a seal is formed. By providing a pressure differential between the interior and exterior of the container a counter pressure may be used to dispense the beverage into the container rapidly with minimal foaming.

Figure 3A:
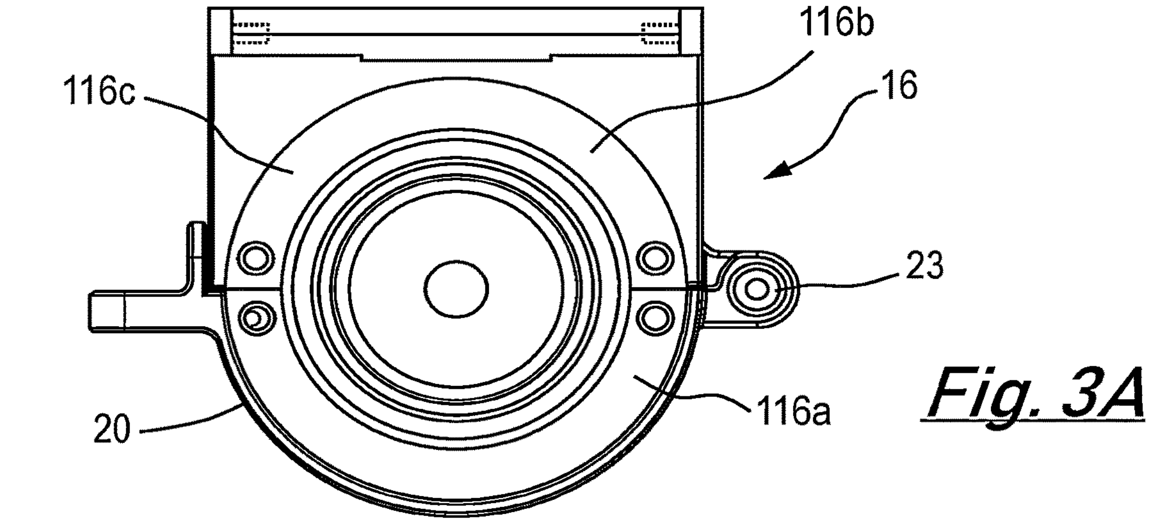
FIGS. 3A, 3B and 3C are overhead views of alternative support elements that may be used in the dispenser apparatus embodiment of FIG. 1.
Figure 3B:
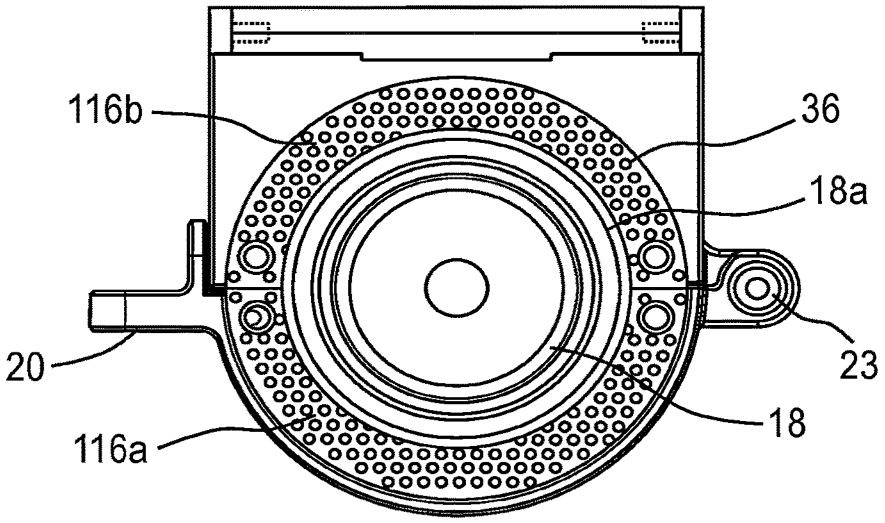
Figure 3C:
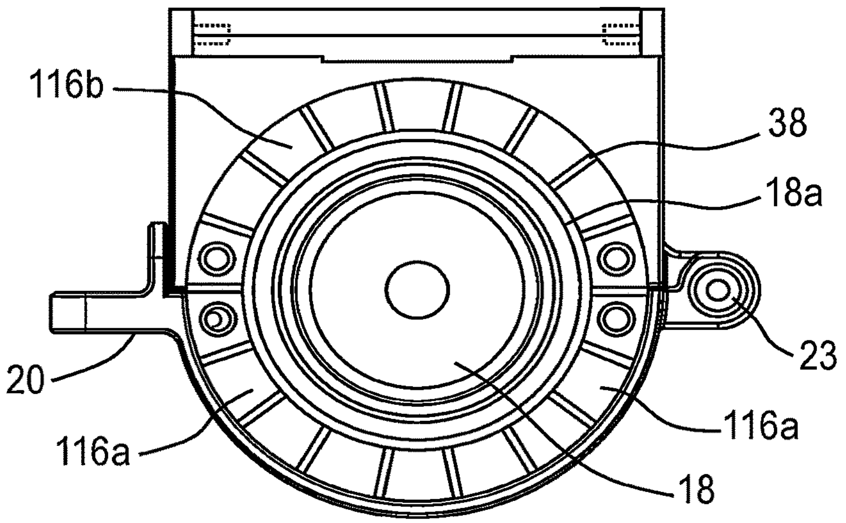

FIG. 3A to 3C show alternative designs for the container support 16 shown from an overhead view. The container support may be selected based on the type and/or shape of the container. The container support may be removed and replaced with a different support design to suit the container type and/or shape. In FIG. 3*a* the upper face 116*c* of the support halves 116*a* and 116*b* is flat and solid made from a resilient and/or slightly deformable material such as silicone or rubber material. Alternative designs for the support are shown on FIGS. 3B and 3C which show holes 36 or radial grooves 38 on the upper face 116*c* of the support halves. The support material is not required to be comprised of a solid impenetrable material. The holes or grooves may facilitate the slight compression of the support and aid in the formation of a seal. In an alternative design, the support may comprise a number of segments supporting the container.

Figure 4A:
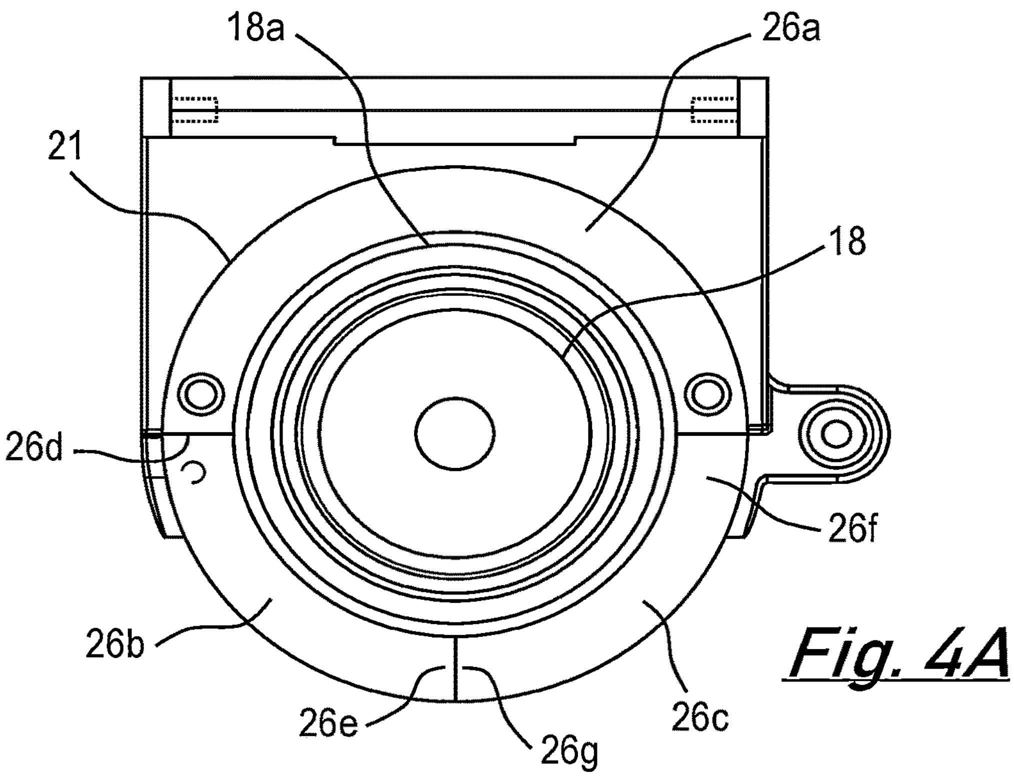
FIGS. 4A to 4B are schematic representations of a dispenser mechanism of the dispenser apparatus of FIG. 1 in accordance with an embodiment of the invention shown in a beverage dispensing and container loading conditions.
Figure 4B:
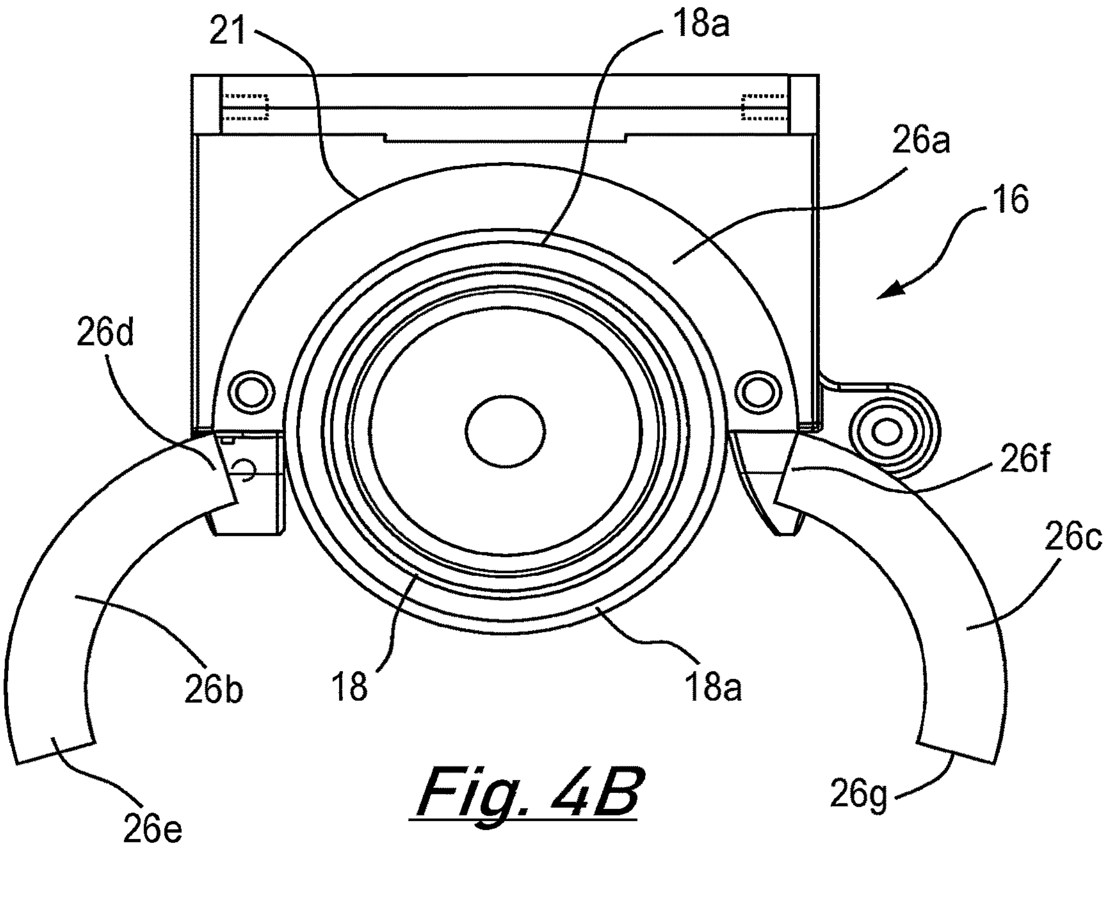

In the above examples the support 16 forms part of the door 20 which is dimensioned to support the rim of the container 18. However, providing a door is optional. FIGS. 4A and 4B show a container support for a dispenser without a door. Alternatively, the support member may extend from the device body and retract once the dispense is complete. FIGS. 4A and 4B show an alternative design for the container support 16. In this example the support comprises three support members 26*a*, 26*b* and 26*c*. A first support member 26*a* is mounted on a wall 21 of the dispenser 14*a*, 14*b*. The second support member 26*b* has a first end 26*d* pivotally mounted to the dispenser body and a second end 26*e*. The third support member 26*d* has a first end 26*f* pivotally mounted to the dispenser body and a second end 26*g*.

When a container is placed or loaded into the dispenser as shown in FIG. 4B, an upper edge or rim 18*a* of the container is partially supported by the first support member 26*a*. In this example the first support member is semi-circular and provides to support to the container.

When the door is closed as shown in FIG. 4A the second and third support members are pivoted such that their second ends 26*e* and 26*g* meet to form semi-circular support. Together with the first support member the second and third members surround the circumference of the container and fully supports the upper edge or rim of the container. In this design no door is required, and the container is positioned or loaded directly into the dispenser.

In the above examples the sealing element 34 has been shown as having a generally flat surface. However, as described in FIGS. 5A to 5C alternative sealing elements may be used. The sealing element may be selected based on the type and/or shape of the container. The sealing elements may be removed and replaced with a different sealing element to suit the container type and/or shape.

Figure 5A:
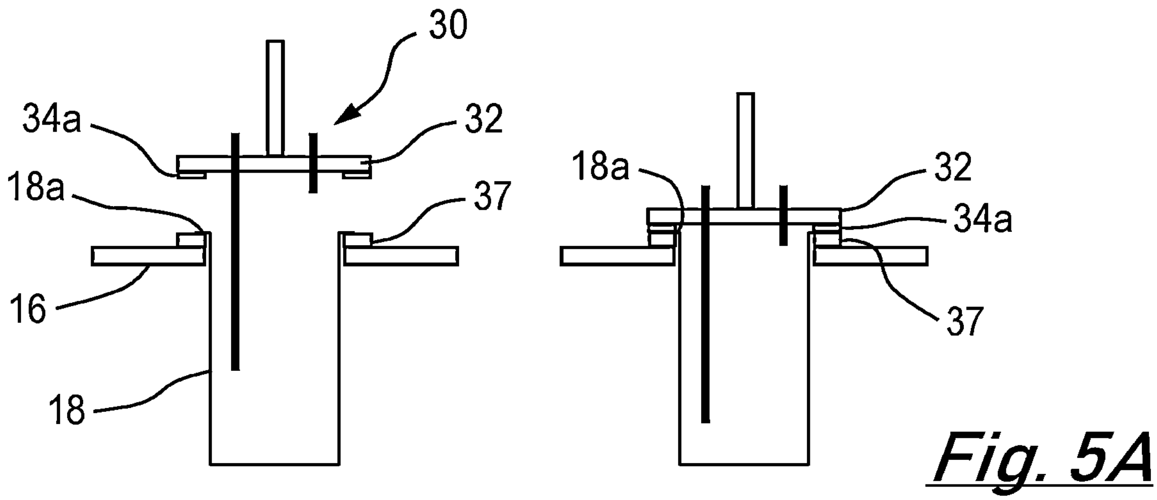
FIGS. 5A, 5B and 5C are schematic representations views of sealing element arrangements that may be used in the embodiment of FIG. 1.

FIG. 5A shows an embodiment where a sealing element 34*a* in sealed and unsealed positions. The sealing element 34*a* is located on the sealing plate 32 of the dispenser head 30 similar to examples described above. However, in this embodiment a second sealing element 37 is provided as a layer on an upper surface of the container support 16. When the container 18 is positioned or loaded in the dispenser, the upper edge or rim 18*a* of the container is supported on the second sealing element 16*d*.

When the dispenser head is lowered as shown in FIG. 5A, a seal is formed between the sealing element 34*a* and sealing element 37. The upper edge or rim 18*a* of the container is sandwiched between the sealing element 34*a* and sealing element 37.

Figure 5B:
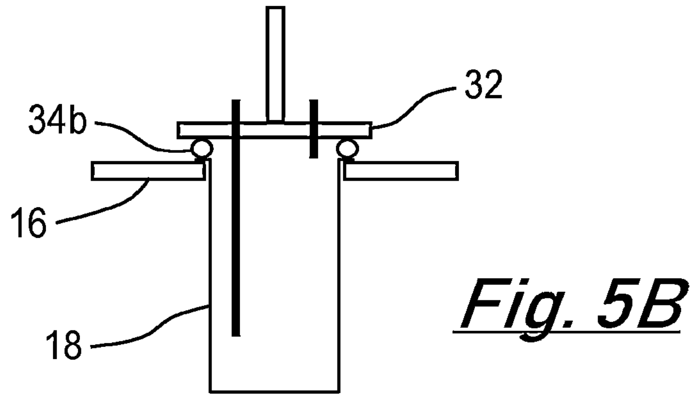

FIG. 5B shows an embodiment where a sealing element 34*b* is in a sealed position. Sealing element 34*b* has a profiled molding rather and a flat seal. The profiled mould sealing element 34*b* may facilitate better compression of the sealing material when it is pressed against the support 16 and upper edge or rim 18*a* of the container.

Figure 5C:
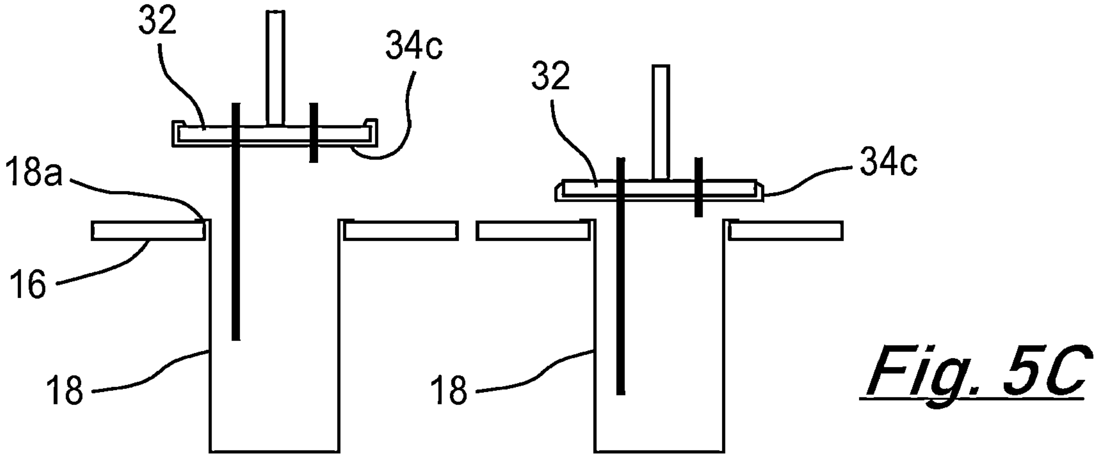

FIG. 5C shows an embodiment where a sealing element 34*c* is in sealed and unsealed positions. Sealing element 34*c* is not restricted to a section of the sealing plate as shown in the examples above. In this embodiment the sealing element 34*c* is provided on the entire underside of the sealing plate.

In the above examples the sealing element has been shown as contacting an upper edge of the container 18. However, as described in FIGS. 6A to 6C an alternative design is to contact an inner surface on the container rim.

Figure 6A:
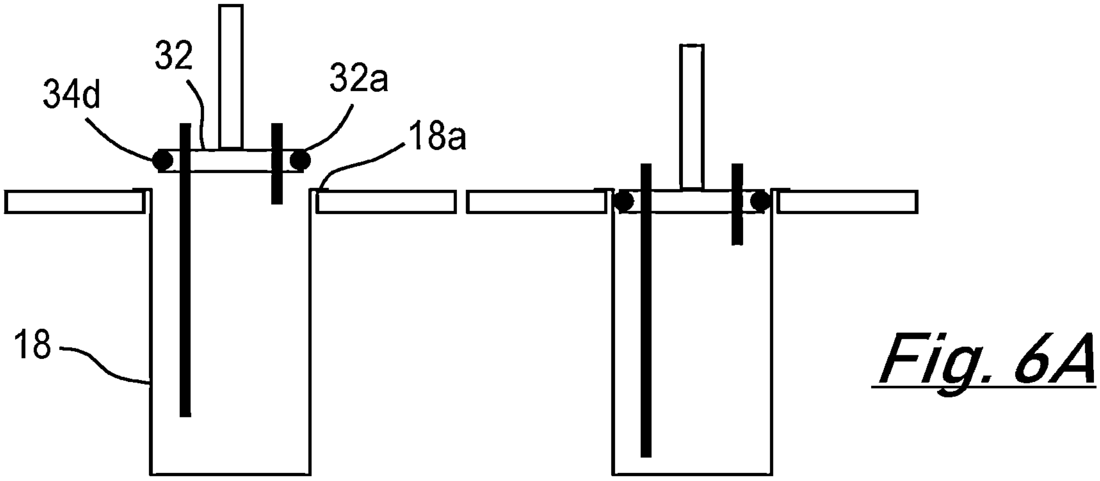
FIGS. 6A, 6B and 6C are schematic representations views of alternative sealing element arrangements that may be used in the embodiment of FIG. 1.

FIG. 6A shows an embodiment where a sealing element 34*d* is located on an outer edge 32*a* of the sealing plate 32 of the dispenser head 32. When the container 18 is positioned or loaded in the dispenser, the upper edge or rim 18*a* of the container is supported on the support 16.

When the dispenser head is lowered as shown in FIG. 6A, a seal is formed between the sealing element 34 and an inner surface on the upper edge of the container.

Figure 6B:
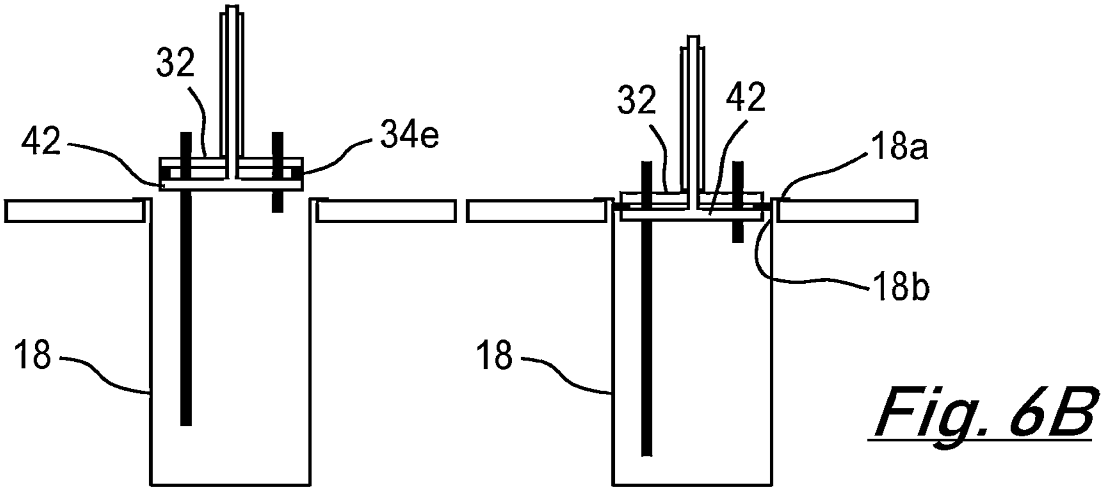
Figure 6C:
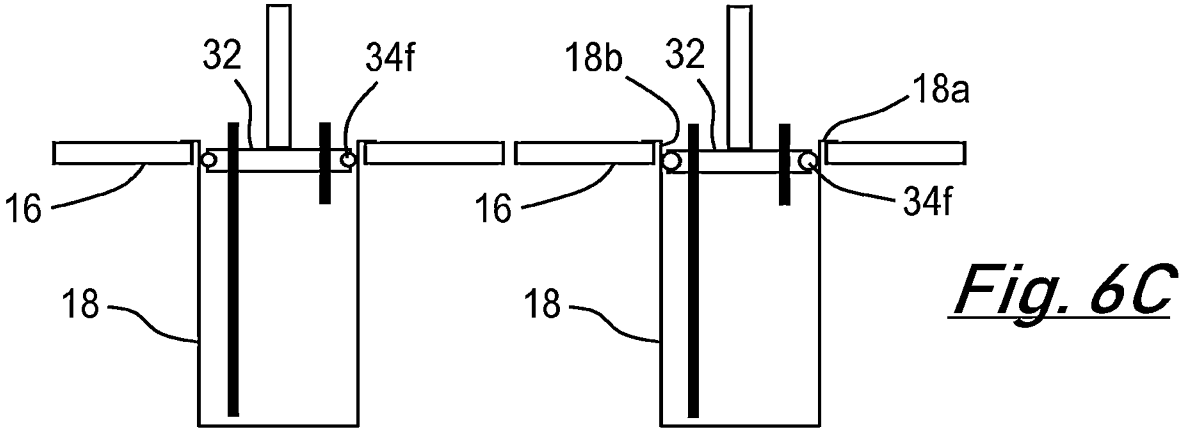

FIG. 6B shows an alternative seal design where a sealing element 34*e* is sandwiched between the sealing plate 32 and a compression plate 42. When the dispenser head is lowered as shown in FIG. 6A, the compression plate is actuated to compress the sealing element 34*e* between the sealing plate 32 and a compression plate 42. As the seal element 34*e* compresses it expands radially to form a sealing barrier between the sealing plate 32 and an inner surface 18*b* on the upper edge 18*a* of the container 18. FIG. 6C shows another seal design where a sealing element 34*f* is inflatable and mounted around an outer edge of the sealing plate 32. As shown in FIG. 6C, the dispenser head is lowered such that the sealing plate and sealing element in a deflated state are within the rim of the container and adjacent to the inner surface of the upper edge of the container. The sealing element 34*f* is then inflated to expand radially and form a seal between the sealing element 34*f* and an inner surface on the upper edge 18*b* of the container.

FIGS. 7A to 7I schematically show the steps of dispensing a carbonated beverage from a dispenser apparatus 10 into a disposable plastic cup container.

Figure 7A:
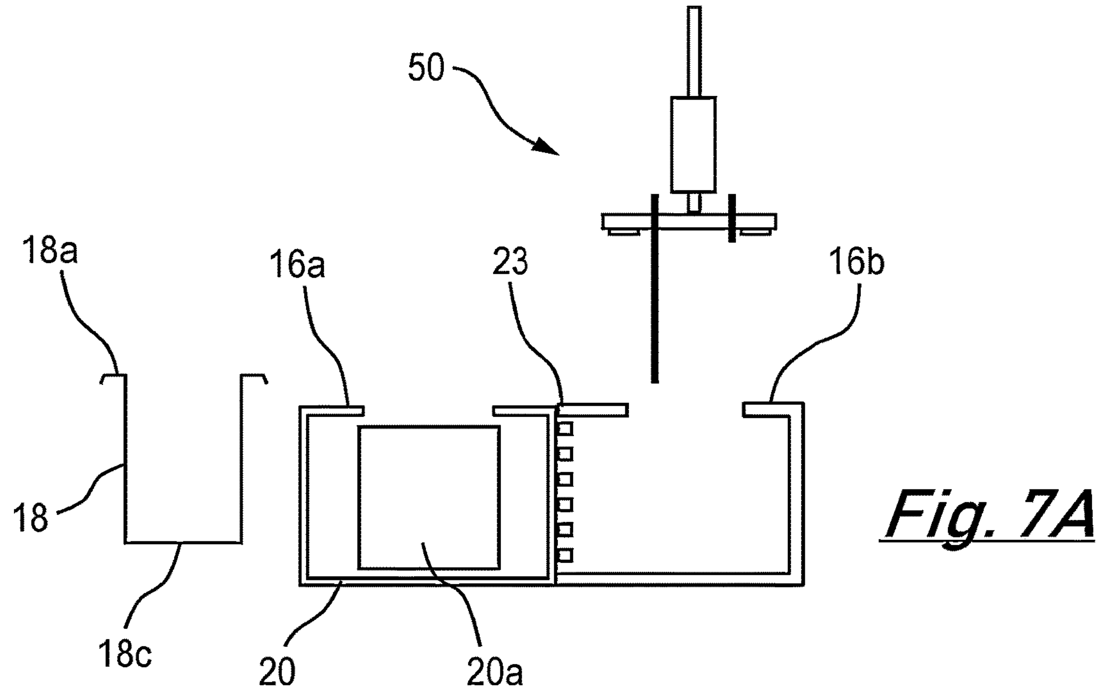
FIGS. 7A to 7I are schematic representations of the dispenser mechanism of the dispenser system of FIG. 1 in accordance with an embodiment of the invention shown at various stages of operation.

As shown in FIG. 7A, dispenser 14*a* has a container support 16*a* and 16*b*. In this example the support 16*a* forms part of the door 20 which is dimensioned to support the rim 18*a* of the container 18. The door 20 is connected the dispenser body 12 by hinges 23. The door 20 has a window 20*a* to allow the filling of the container 18 to be monitored.

The window is made from transparent plastic or other material and affords the user a clear view of the dispense process which is uniquely visually attractive and pleasing to the user. The door 20 serves a purpose of preventing beverage from splashing out of the dispenser in the event of a malfunction.

The weight of the container 18 is fully supported by the support 16*a*, 16*b*. Optionally a second support 27 is located underneath the base 18*c* of the container to provide additional support to the container.

The dispenser mechanism 50 comprises a dispenser head 30. The dispenser head 30 comprises a sealing plate 32 connected to an actuator 36 in this example a pneumatic cylinder. The sealing plate 32 comprises a sealing element 34 on its underside 33.

The sealing element 34 is designed and dimensioned to form a sealing barrier between the container 18 and the sealing plate 32 when the sealing element 34 is pressed in contact with the rim of the container 18. In this example the seal element 34 is made of a silicone material. The sealing element 34 is designed to maintain a pressure differential between the interior and exterior of the container 18 when the sealing barrier is formed.

The sealing plate 32 has a beverage inlet port 60 and a pressure control port 62. In this example an optional dip tube 45 is connected to the beverage inlet port 60 on the underside of the sealing plate.

Figure 7B:
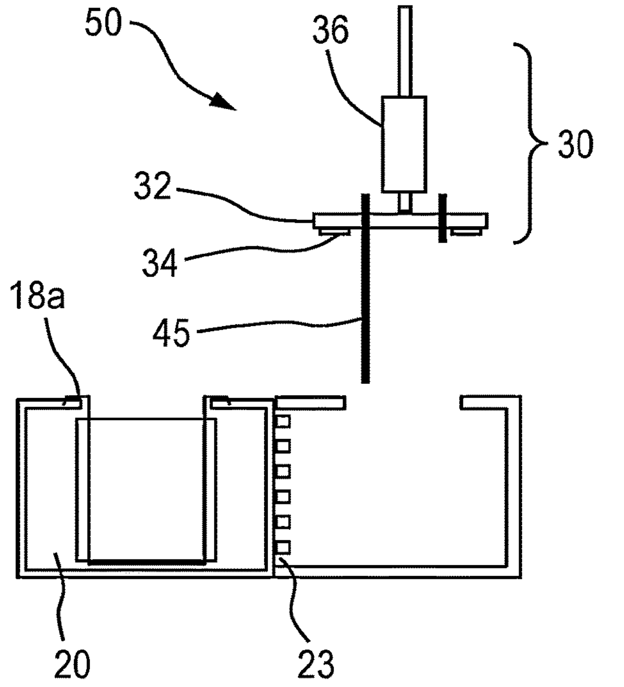
Figure 7C:
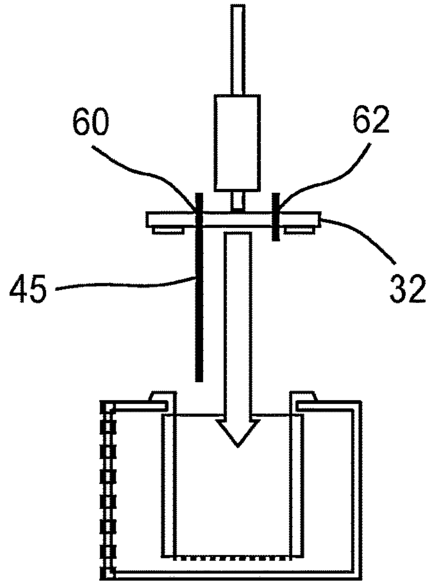

As shown in FIG. 7B, a container 18 is positioned in the container support 16*a* in the door 20. The door 20 is then closed as shown in FIG. 7C and the dispensing mechanism is actuated.

Figure 7D:
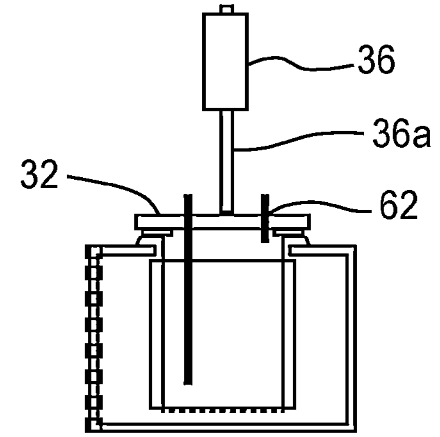

As shown in FIG. 7D the pneumatic cylinder 36 is actuated to extend its arm 36*a* lowering the sealing plate 32 to contact the sealing element 34 with the container. The sealing element 34 is pressed against the rim 18*a* of the container 18 forming a sealing barrier. The pneumatic cylinder provides a downward force in the region of 588 N (60 kg) onto the rim 18*a* of the container 18 to ensure a sealing barrier is formed to allow a counter pressure to applied to the interior volume of the container.

As the seal barrier allows a pressure differential to form between the internal volume and external volume of the container, the outside of the container is at atmospheric pressure whilst the internal volume is pressurised. The door does not provide an air-tight seal with dispenser body to maintain pressure other than atmospheric pressure.

A locking mechanism may be provided in the manifold assembly such that the locking mechanism engages with the sealing plate 32, sealing element 34 and/or door 20 such that the sealing element 34 and/or door 20 cannot be opened whilst the sealing barrier is formed between the sealing plate 32 and the container.

A safety system including locks and sensors may be connected to the door 20 and/or support 16 and incorporated into the dispenser 14*a*, 14*b* such that actuation of the actuator 36 and the beverage dispensing operation will not start or is stopped if, for example, the hinged door 20 is not closed flush or a container 20 has not been placed in contact with the support 16.

As shown in FIG. 7D, the rim 18*a* of the container 18 is sandwiched between the support 16 and the sealing element 34. This ensures an effective seal is made and the container is held rigidly in position for the dispensing of the beverage. It is important that the container is moved as little as possible to avoid the bubbles or gas held in the carbonated beverage coming out of the liquid.

Figure 7E:
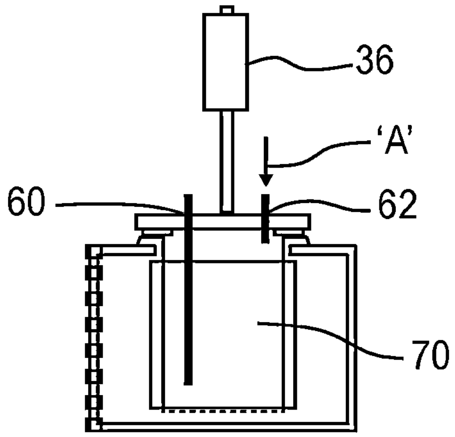

Once a seal has been made the dispenser system is actuated to fill the container 18 with pressurised air 70 via the pressure control port 62 which is represented by arrow "A" in FIG. 7E. The dispenser system continues to apply pressurised air 70 into the container until an internal container pressure range of 0.3 to 6 Bar depending on the type and material of the container. In this example a disposable plastic pint glass is used an internal container pressure of 1.2 Bar.

Figure 7F:
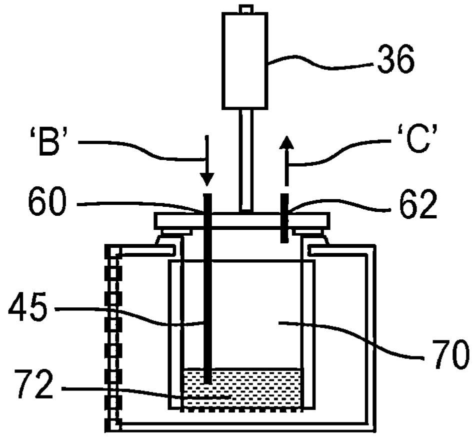
Figure 7G:
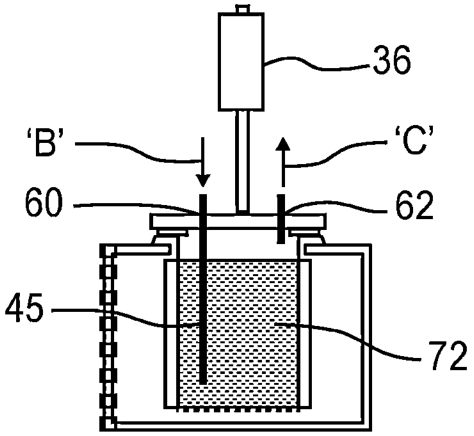

The dispenser system is then actuated to pump a beverage 72 into the pressurised container through the beverage inlet port 60 and through optional dip tube 45 which is represented by arrow "B" in FIG. 7F. As the beverage 72 is pumped into the container the pressurised air 70 is displaced out of the container through pressure control port 62 and removed from the container as represented by arrow "C" in FIGS. 7F and 7G.

Figure 7H:
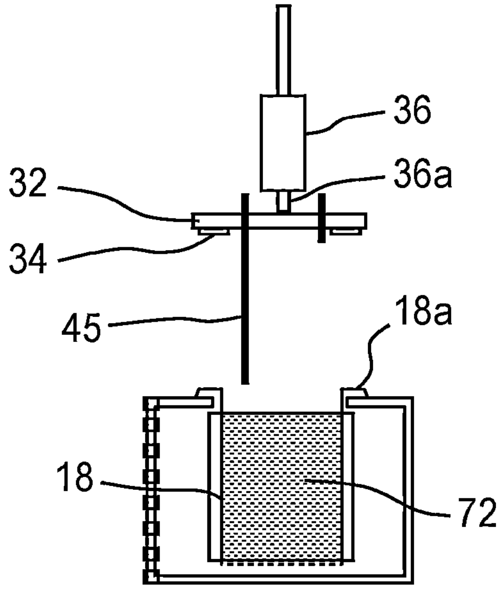

After a selected period of time following completion of the dispense process, the remaining air is released through pressure control port 62. As shown in FIG. 7H, the pneumatic cylinder 36 is actuated to retract the arm 36A and lift the sealing plate 32 in an upward direction away from the container 18. As the sealing element 34 is lifted off the rim 18*a* of the container 18, the seal barrier between the seal plate 32 and the container is broken. Exposure of the beverage 72 to atmospheric pressure causes the formation of bubbles as they break out of the carbonated beverage 72.

Figure 7I:
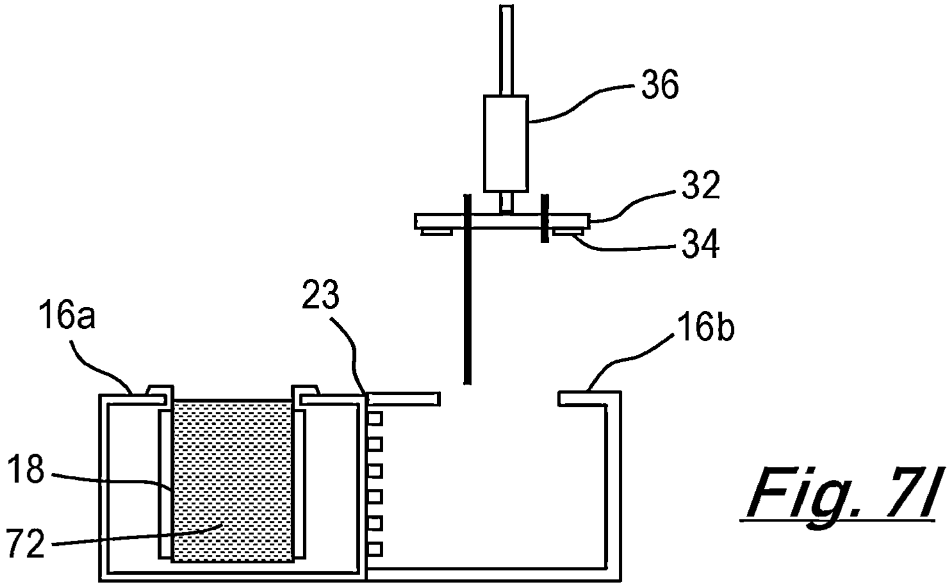

The door 20 is then opened by pivoting on hinges 23 to provide access to the container 18 and its contained beverage 72 as shown in FIG. 7I. The user is able to grasp the container 18 and lift it away from the door 20 and support 16*a*.

Figure 8A:
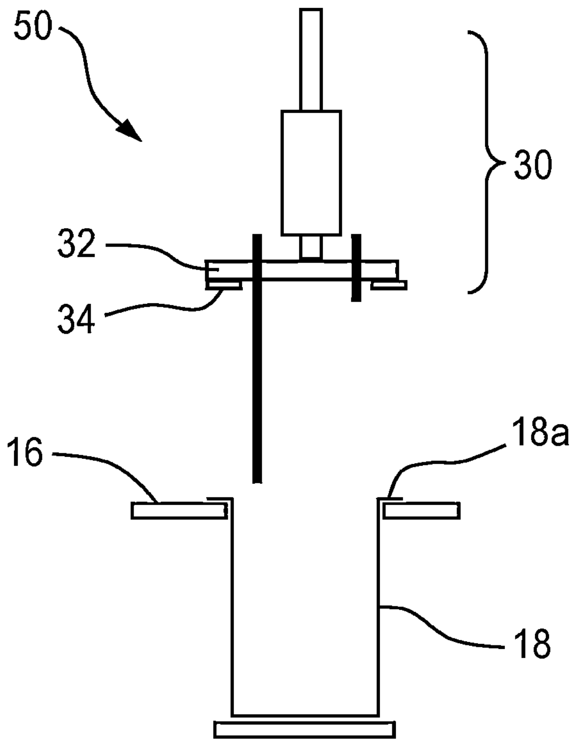
FIGS. 8A and 8B are schematic representations of an alternative dispenser mechanism that may be used in the dispenser system of FIG. 1 in accordance with an embodiment of the invention shown at container loading and beverage dispensing conditions.
Figure 8B:
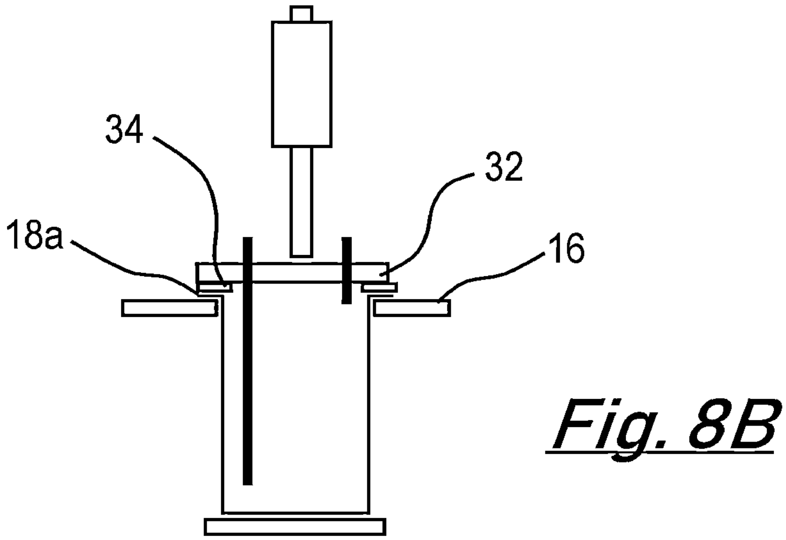

FIGS. 8A and 8B schematically show the dispensing mechanism 50 for a dispenser 14*a*, 14*b* which does not have a door. The steps are similar to the steps described in FIGS. 7A to 7H. However, the container support 16 is located on the dispenser body as described in FIG. 4A.

Figure 9:
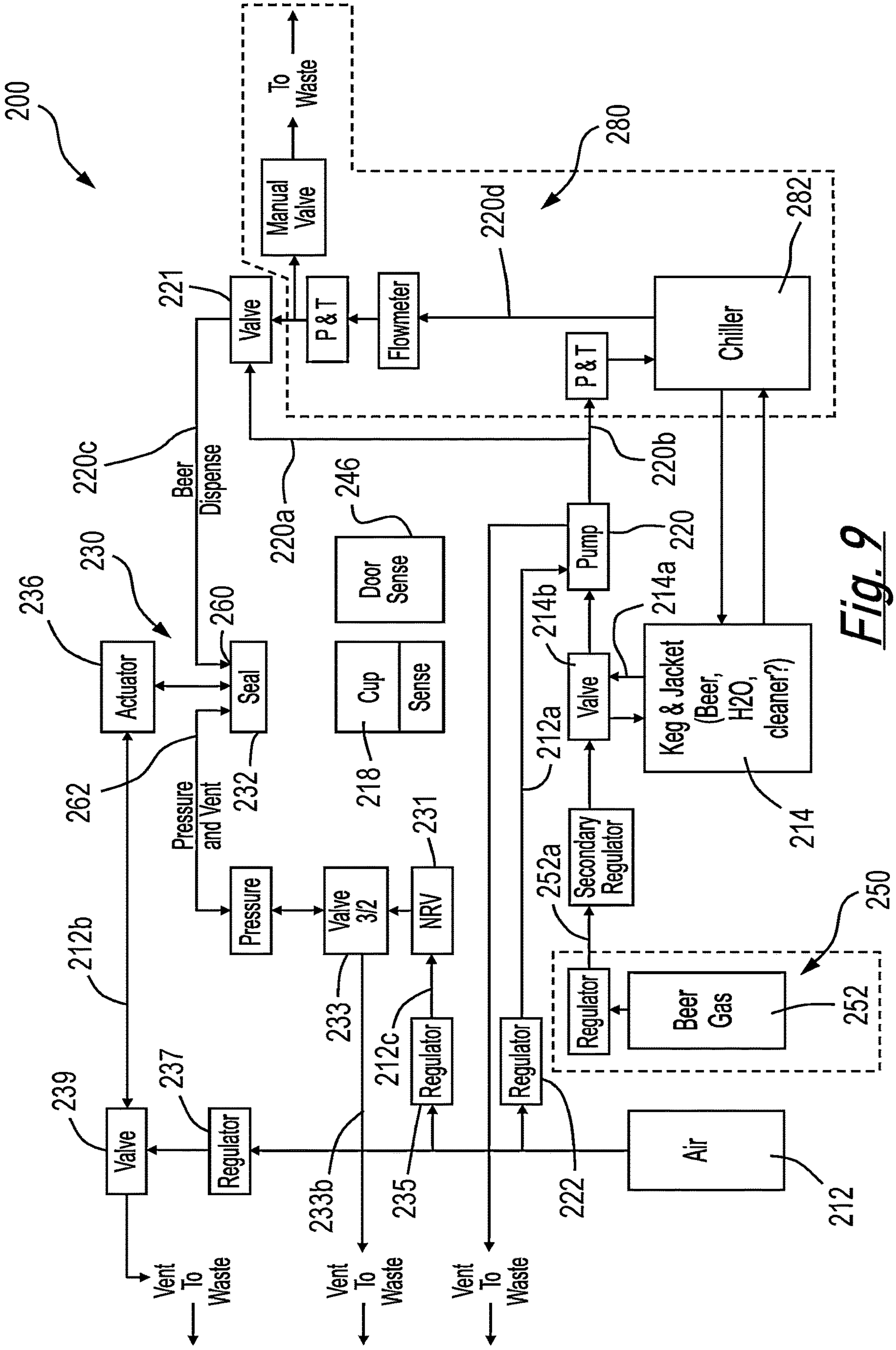
FIG. 9 is a schematic diagram of the circuit of the dispenser system of FIG. 1.

FIG. 9 shows a pressure and flow circuit for the beverage dispenser system according to an embodiment of the invention. The control unit which is connected to, monitors and controls all valves, sensors and actuators in the system has been removed for clarity.

The circuit 200 includes an air supply 212 and a beverage source 214. The air supply 212 has a three flow lines 212*a*, 212*b*, 212*c*. Flow line 212*a* is connected via a regulator 222 to a fluid pump 220. Flow line 212*a* is configured to actuate the fluid pump 220.

Flow line 212*b* is connected to actuator 236 via a regulator 237 and valve 239. The actuator is configured to pneumatically control the actuation and movement of the dispenser head 230.

Flow line 212*c* is connected to a pressure port 262 on the dispenser head 230 via regulator 235, 3-way valve 233 and check valve 231. The purpose the pressured air delivered to the pressure port 262 is to create a counter pressure in the container 218 which allows for the rapid dispensing of a beverage into the container 218 without gas breakout from the beverage solution which would result in excessive foam or bubble formation.

The beverage source 214, in this example a pressurised keg, is connected to flow line 214*a*. Flow line 214*a* is connected to pump 220 via a valve 214*b*. Pump 220 is configured to pump a beverage from the beverage source 214 to a container 218 via a beverage inlet port 260 on the dispenser head 230.

Pump 220 is designed to be actuated when it detects a lower pressure or pressure drop in flow line 220*a*. This occurs when the valve 221 is opened.

In use, an operator places a container 218 into the container support (not shown) of the dispenser apparatus.

Before the dispense cycle commences, the control unit checks the status of the safety system which includes checking the internal door sensor 246 to confirm that a container 218 is present and checking the status of the door safety switch to confirm that the door is closed. If either sensor reports a negative value, the dispense cycle stops and waits for the user to correct the error.

Upon a positive signal from the safety systems, the control unit opens valve 239 to activate actuator 236 to move the dispenser head 230. The dispenser head 230 is lowered towards the container 218 causing the manifold sealing plate and sealing element 232 to form a sealing barrier with the container 218.

Once a seal has been made, the control unit actuates valve 233 to open the pathway between the air supply 212 and the outlet on the dispenser manifold. Pressurised air then fills the container. Valve 233 is an air powered, electrically operated valve.

The control unit controls the pressure at which air injection is stopped. The pressure level is adjustably set by an electronically or manually controlled regulator. The pressure may range from 0.4 Bar up to the maximum pressure rating of the container which is potentially in excess of 5 Bar.

A pressure sensor (not shown) located within the dispenser head 230 monitors the internal pressure of the container 218 to confirm that the seal has held the applied counter-pressure. In the event of a failure to build up to the required counter-pressure within a pre-determined period, the control unit halts the dispense cycle. A digital display situated close to the counter pressure manifold may provide a real-time pressure level of counter-pressure in the container 218.

If the container 218 successfully holds the required counterpressure, a signal is sent to open valve 221 which actuates pump 220 to pump beverage from the beverage source 214 through flow line 220*a* and 220*c* which is made of a flexible plastic tube to the beverage inlet port 260 on the dispensing manifold and into the container 218. The flexible plastic tube is sufficiently 'slack' to allow for the raising and lowering of the dispensing manifold by the actuator 236 without causing the tube to tighten.

The pump 220 will continue to pump beverage until the control unit closes valve 221 which de-actuates pump 220 after a pre-programmed elapsed time. Alternatively, or additionally a flowmeter may be provided in flowlines 214*a*, 220*a*, 220*c* or dispenser head 230 to measure that the required volume of beverage has been dispensed or a sensor recognises that beverage level in the container has reached the required level.

During the pumping of beverage, the addition of the beverage into the pressurised container increases the internal pressure of the container 218. The 3-way valve 233 is set with a threshold vent value. When the internal pressure level in the container exceeds this threshold pressure value, pressured air from the container is released by valve 233 through the pressure port 262 along vent pathway 233*b* until the desired internal pressure level is again reached.

As the container 218 is filled, the volume of pressurised air in the container is displaced by beverage and the pressurised air is vented through pathway 233*b*.

The beverage is dispensed into the container rapidly during the dispense cycle. If the beverage is carbonated foaming is mitigated or minimised as the counter-pressure in the container during dispensing substantially prevents gas dissolved or mixed within carbonated beverage from coming out of solution.

Once the beverage dispensing phase is complete, the 3-way outlet value 233 is switched to open vent pathway 233*b* by the control unit. The counter-pressure provided by the pressurised air, along with any excess beverage in the container, is vented through pathway 233*b* to a waste receptacle. Subsequently or simultaneously the control unit actuates the actuator 236 to lift the dispense manifold away from the container 218 breaking the sealing barrier between the sealing plate and the container.

Once the dispense manifold 230 is withdrawn, the door 30 may be manually opened allowing the operator to retrieve the filled container 218. Alternatively, once the dispense manifold 230 is withdrawn, the door 30 may be automatically opened by a mechanism to present the dispensed beverage to the user.

The circuit 200 may be modified to accommodate different beverage types or dispenser systems.

For example, if a beverage is stored in a non-pressured vessel or the pressure in the beverage source 214 is not sufficient to reach the pump 220, a separate beverage pressure system 250 may be used, as shown in dotted lines in FIG. 9. The beverage pressure source 252 is connected to valve 214*b* before the pump 220. The pressure system 250 is configured to pressurise the flow line 252*a* to provide beverage from the beverage source 214 through the valve 214*b* (when open) to the pump 220. The beverage pressure source may be a pressurised gas canister, compressor tank, accumulator tank or pressurised gas bottle.

The beverage pressure source may be an inert gas, a mix of gases, clean air or carbon dioxide. The beverage pressure source may be applied to the vessel via one or more pressure-reducing manifolds to maintain or increase the vessel pressure and/or carbonation.

Pressurised or non-pressurised vessels may include post-mix concentrates used with carbonators for carbonated soft drinks. Other beverage sources may include 'bagged' bulk containers such as Intermediate Bulk Containers (IBCs) with capacities of approximately 1 $m^3$ through to mobile tankers with capacities ranging up to 35 $m^3$.

Another way the circuit may be modified is to provide a beverage conditioning system 280 as shown in dotted lines in FIG. 9. The beverage conditioning system 280 allows parameters of the beverage such as temperature to be adjusted and controlled. In the present example the beverage conditioning system is a temperature conditioning system which allows the specific beverage to be dispensed at an optimum desired temperature for consumption.

The beverage conditioning system 280 includes a cooling device 282 connected downstream of the pump 220 in pathway 220*b* (which is an alternative pathway to pathway 220*a*). Pathway 220*b* is in fluid communication to the beverage inlet port 260 on the dispenser head 230 though valve 221 and pathway 220*c*.

The cooling device 282 may contain tubes coiled within a refrigerated liquid/ice bank. The number and length of coils may be selected to ensure the optimum rate and magnitude of cooling to provide a consistent target beverage outlet temperature.

The cooling device may include a refrigerant cooling compressor, the rate of the refrigerant cooling compressor may be dynamically controlled by the control unit to maintain desired beverage temperatures at different dispense rates. The conditioning/cooling device may be placed inside or outside the body of the dispenser device.

The operation of the dispenser is the same as previously described as above. However, after leaving the pump 220 the beverage passes through the cooling device 282 along pathways 220*b* and 220*d* before being dispensed into container 218 via valve 221, pathway 220*c*, the dispenser head 230 and beverage inlet port 260.

Flow, pressure and/or temperature sensors can be deployed along flow line 220*b* to facilitate monitoring of beverage flow conditions. All pipes and flow lines described above are may be fixed or flexible and are formed from materials which are approved for use in food and drink environments such as food-grade plastic or stainless steel.

The description provided above relates to a single dispense point (beverage inlet port 260 on the dispenser head 230. However, multiple dispense points can be incorporated in to the beverage dispensing apparatus and controlled by at least one control unit. Pipe diameters of ⅜" are utilised in a preferred embodiment of the apparatus. However, it will be appreciated that larger-bore pipes (½" or greater) may be used to facilitate greater volumetric flow rates and reduce friction between the beverage and the pipe internal wall.

Figure 10A:
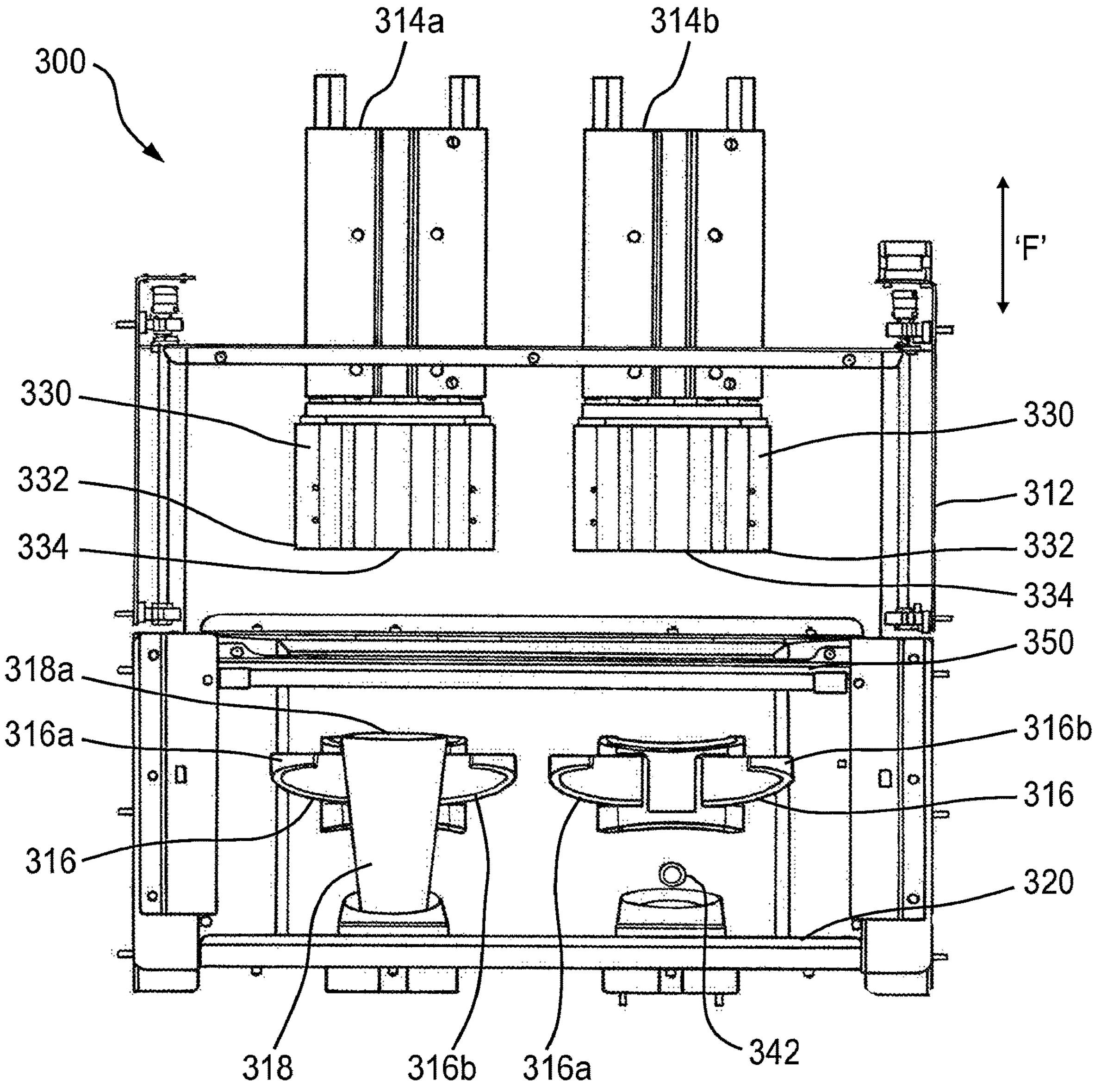
FIGS. 10A, 10B and 10C are schematic and perspective views of a dispenser system in accordance with an embodiment of the invention.
Figure 10B:
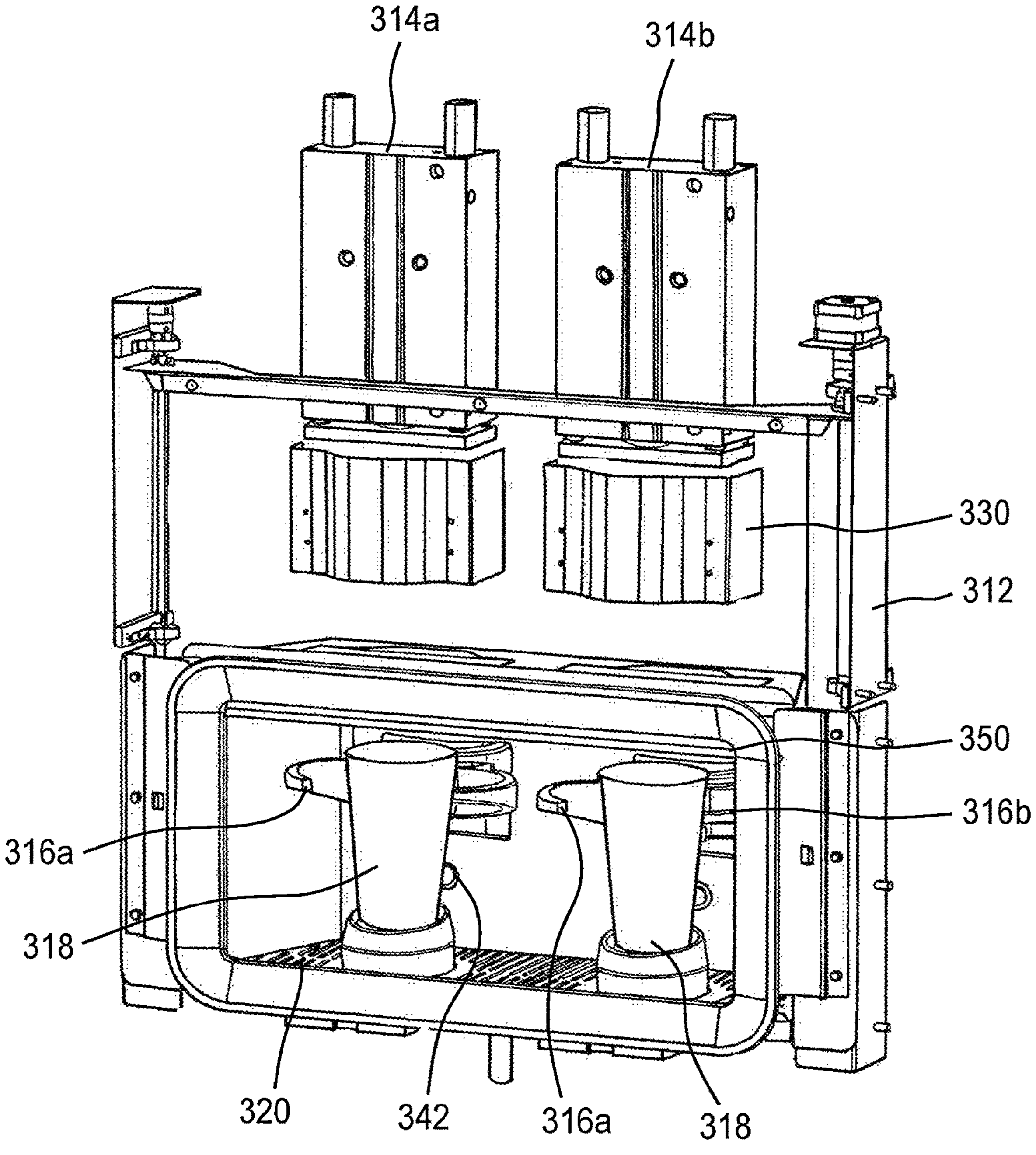
Figure 10C:
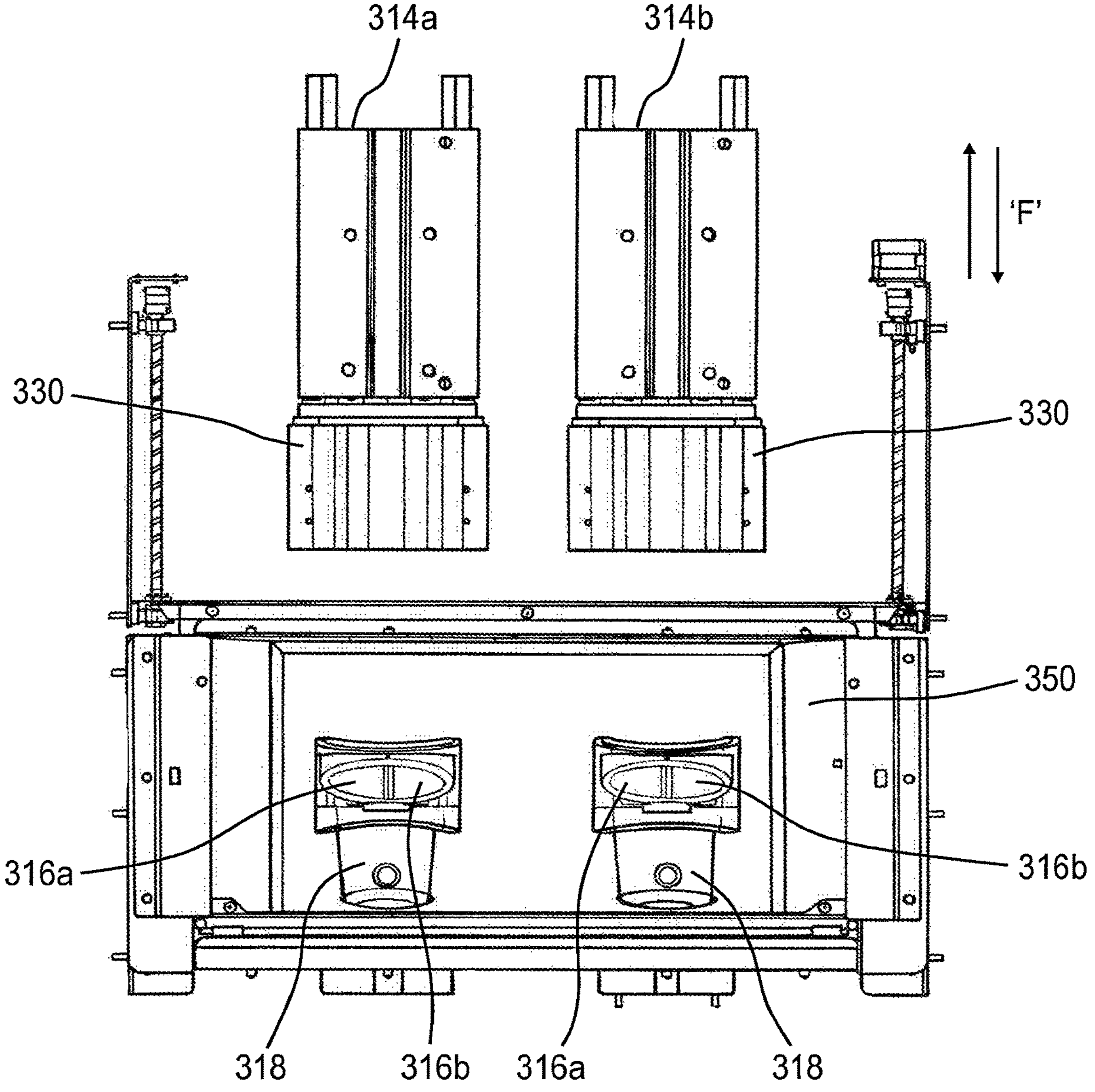

FIGS. 10A, 10B and 10C show a dispenser system 300 according to an embodiment of the invention. The system has a main dispenser body 312, with two dispenser units 314*a* and 314*b* shown. The dispenser has a drip tray 320 located below the dispensers 314*a* and 314*b*. Each dispenser has a container support 316. The support 316 is configured to retain, position and support a container 318 for dispensing a beverage into the container. In FIG. 10A only one container is shown for clarity. Two containers are shown in FIGS. 10B and 10C. The dispenser system shown in FIGS. 10A, 10B and 10C has two dispenser units 314*a* and 314*b*, the system may comprise a plurality of dispensers in the main dispenser body 312.

In this example the support 316 is split into two semi-circular support members or grippers 316*a*, 316*b*. In this clamshell support design, the support members 316*a* and 316*b* are pivotally mounted to the dispenser and are designed to locate a container in the correct position and support the container during dispensing.

When a container is placed or loaded into the dispenser as shown in FIGS. 10A and 10B, sensors 342 detect the presence of the container. The user selects a preferred drink and/or makes payment which actuates the dispenser system. A screen 350 is lowered which restricts the user's access to the containers. The screen 350 acts as a safety guard to prevent the user from contacting components of the dispenser during dispensing and to protect the user in the event of the container breaking. The screen also acts as a splash guard. FIG. 10C shows the screen in a lowered position. In this example the screen 350 has an electronic resistor safety bar which will stop moving if it detects an obstruction.

When the screen 350 is lowered the support members 316*a* and 316*b* are pivoted in a direction toward each other to close around the container. Together the support members 316*a* and 316*b* surround the circumference of the container ensuring the container is in the correct position for dispensing. The support members fully support the upper edge or rim of the container as shown in FIG. 10C.

The dispenser head manifold 330 of each dispenser 314*a*, 314*b* is designed to be lowered and raised in a vertical direction along arrows "F" relative to the upper edge or rim 318*a* of the container 318. In this example a pneumatic system is used to move a dispenser head assembly down on to the top rim of the container. The dispenser head assembly is attached to rails which allow the dispenser head assembly to be raised and lowered by pneumatic or other suitable means.

The dispenser head 330 comprises a sealing plate 332 which has a sealing element 334 on a section of the sealing plate.

The support members 316*a* and 316*b* are designed to support the container and align the upper edge or rim 318*a* of the container 318 with the sealing plate to allow an effective seal to made with the sealing element. In this example the seal is designed to maintain a differential pressure ('counter-pressure') up to 1.8 bar as the pneumatic system applies a substantial downward force of approximately 1160 N onto the rim of the container. The sealing element is designed and dimensioned to form a sealing barrier when it is pressed in contact with and/or clamped against the support 316 and/or the upper edge, inner edge or rim 318*a* of the container 318. In this example the sealing element 334 is made of a resilient material such as silicone or rubber and has a flat sealing surface.

The sealing element is designed to maintain a pressure differential between the interior and exterior of the container when a seal is formed. By providing a pressure differential between the interior and exterior of the container a counter pressure may be used to dispense the beverage into the container rapidly without excessive foaming.

Once the dispense is completed the dispenser head manifold is raised breaking the seal with the container. The grabber support members 316*a* and 316*b* open and pivot away from one another and the screen is raised.

Figure 11A:
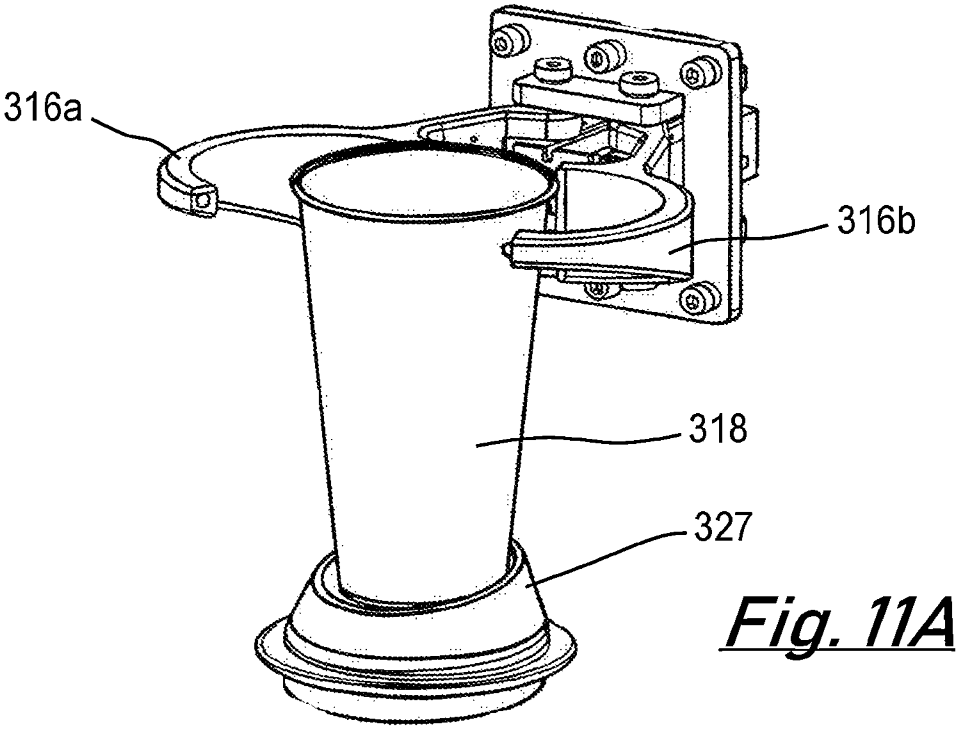
FIGS. 11A and 11B are enlarged perspective views of the container supports in the dispenser system of FIG. 10A.
Figure 11B:
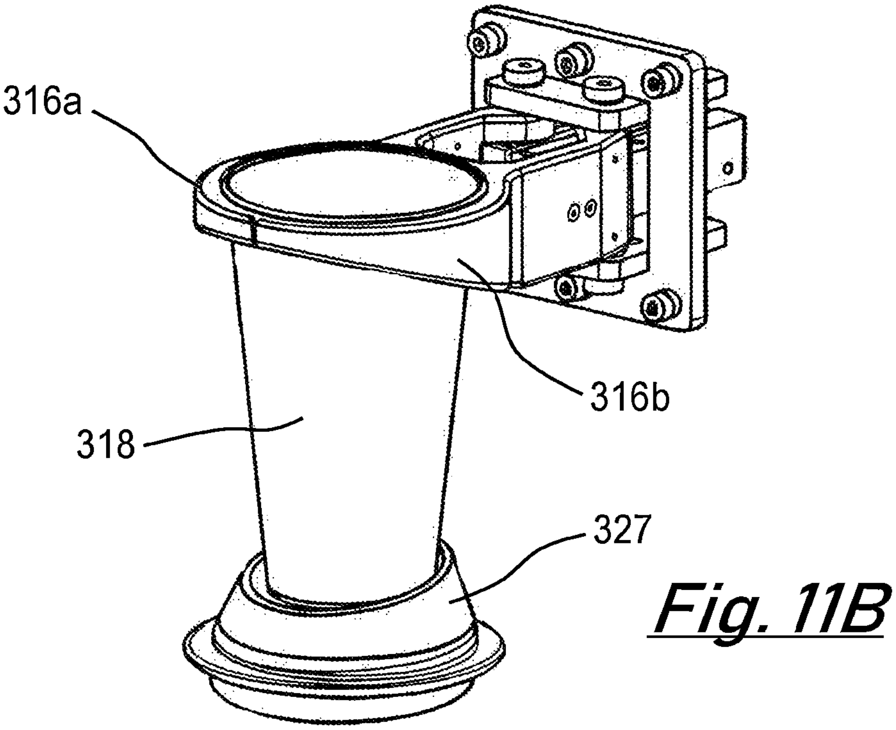

FIGS. 11B and 11B show enlarged perspective views of container supports in the dispenser system of FIG. 10A.

The container 318 is positioned or loaded directly into the dispenser system and support members 316*a* and 316*b* are pivoted in a direction toward each other to close around the container 318. The support members 316*a* and 316*b* surround the circumference ensuring the container is supported in the correct position relative to the dispenser head for dispensing.

In this example a base support or insert 327 is located underneath each container 318 to provide additional support and assist in the positioning of the container in the dispenser. The base support 327 is removably mounted on the dispenser body. It will be appreciated the dispenser system can accommodate containers of different sizes by replacing each base support with another base support having different dimensions.

For example. by inserting a base support with increased height, a shorter container may be used in the dispenser system. The base support raises the container to allow an effective seal to be made between the container and the sealing element. The base support allows the dispenser system to be customised or adapted to accept a range of different container dimensions.

Figure 12:
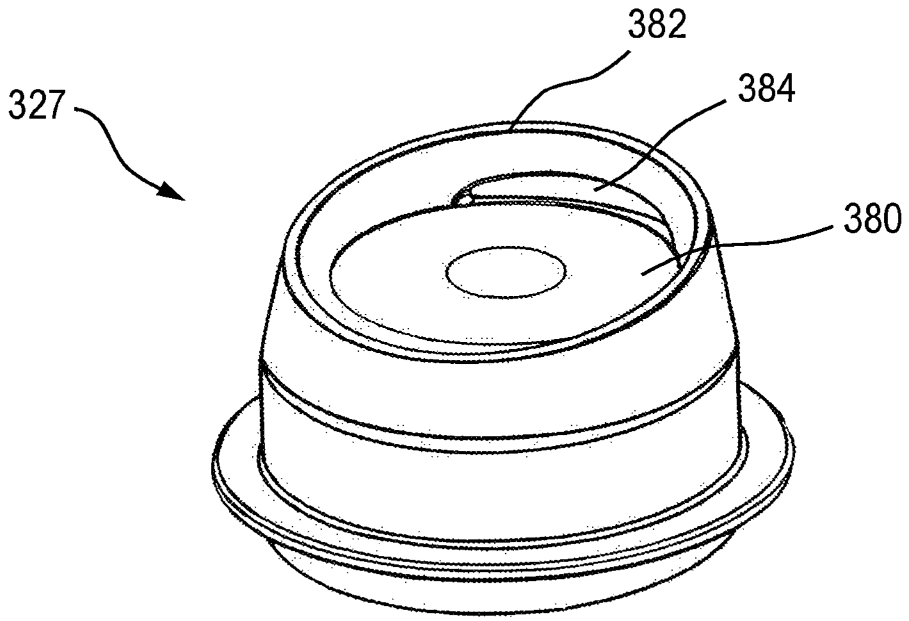
FIG. 12 is a perspective view of a base support in the dispenser system of FIG. 10A.

FIG. 12 shows an enlarged view of the base support or insert 327. The base support has a container support surface 380 with a raised projection or rim 382 arranged along an outer edge of the surface. The rim 382 assists in locating the container on the support surface. An aperture 384 in the rim provides a pathway for excess beverage to drain.

In the above example, the position of the support members 316*a* and 316*b* is fixed. However, it will be appreciated that the support members 316*a* and 316*b* may be movable (lowered and raised) in a vertical direction to allow them to grip, locate and support containers of different heights.

It will be appreciated that the base support may be made of any material that can support a container. In the present example the base support is made of a transparent or translucent material such as plastic or glass. The base support allows light to the transmitted through its structure and different colours of light may be transmitted by the dispenser system through the base support to indicate the status of the dispensing operation. For example, the base support may glow red (or another colour) to signify that dispense is in progress and glow green (or another colour) to signify that dispense is complete.

Figure 13A:
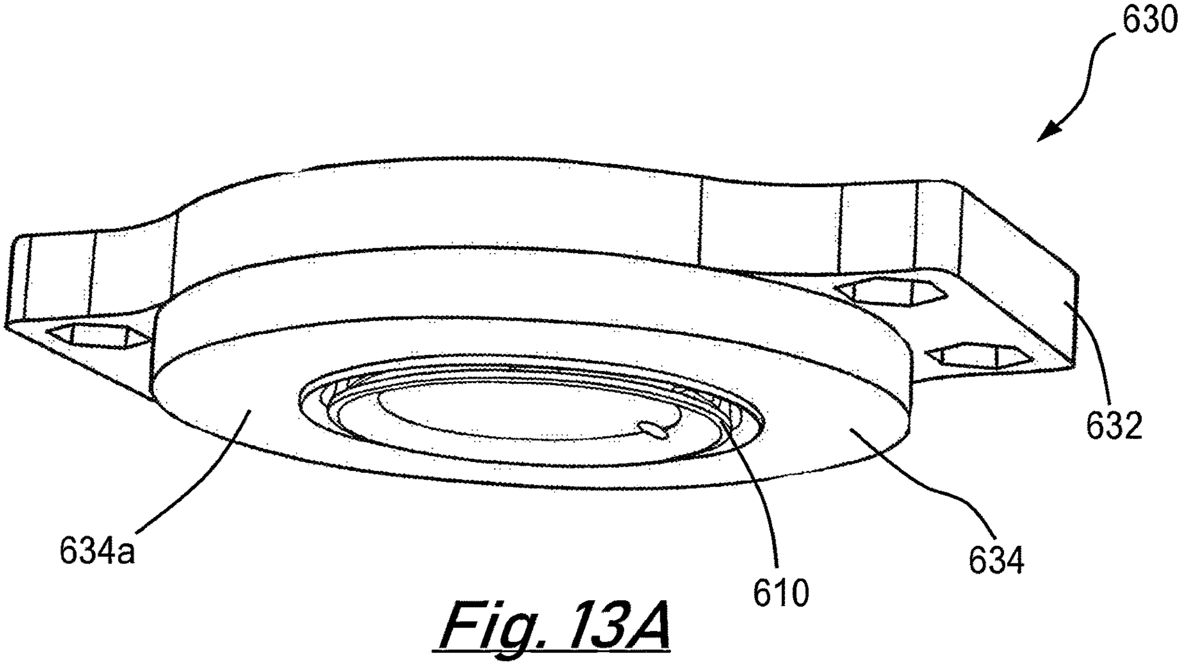
FIGS. 13A to 13D are schematic views of a sealing plate that may be used in the dispensers of FIGS. 1 and 10A.
Figure 13B:
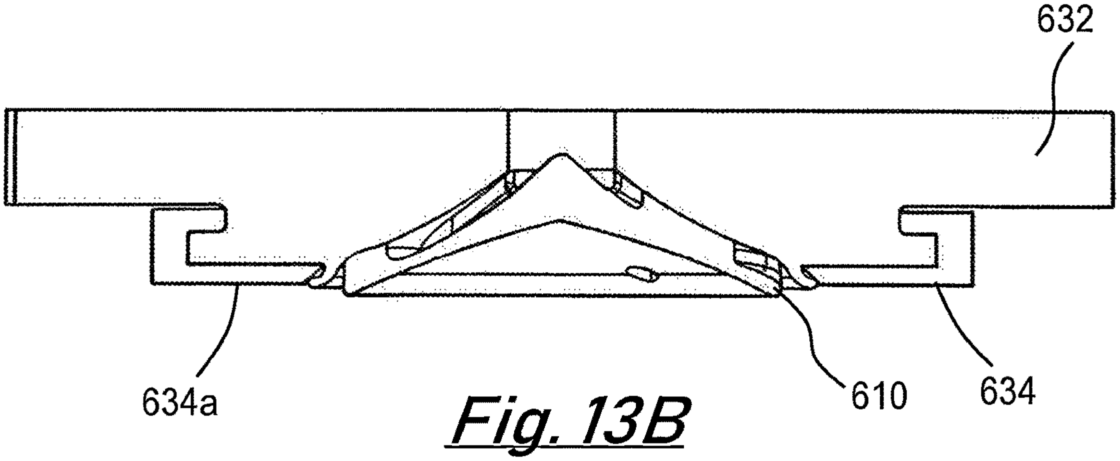

FIG. 13A shows a perspective view of a dispenser head manifold 630 with a nozzle 610 for use in a dispenser system. The dispenser head manifold has a sealing plate 632 which has a sealing element 634 mounted on a radial lip on the underside of the sealing plate 632.

This method of attachment makes it easy to replace or clean the sealing element 634 without the need for any tools or disassembly of other parts.

The dispenser head manifold 630 is designed to be lowered and raised in a vertical direction relative to the upper edge or rim of a container. The sealing element 634 is designed and dimensioned to form a sealing barrier when it is pressed in contact with and/or clamped against a container support and/or an upper edge, inner edge or rim of the container. In this example the sealing element 634 is made of a resilient material such as silicone or rubber and has a flat sealing surface 634*a*.

The sealing element 634 is designed to maintain a pressure differential between the interior and exterior of the container when a seal is formed. By providing a pressure differential between the interior and exterior of the container a counter pressure may be used to dispense the beverage into the container rapidly without excessive foaming.

Figure 13C:
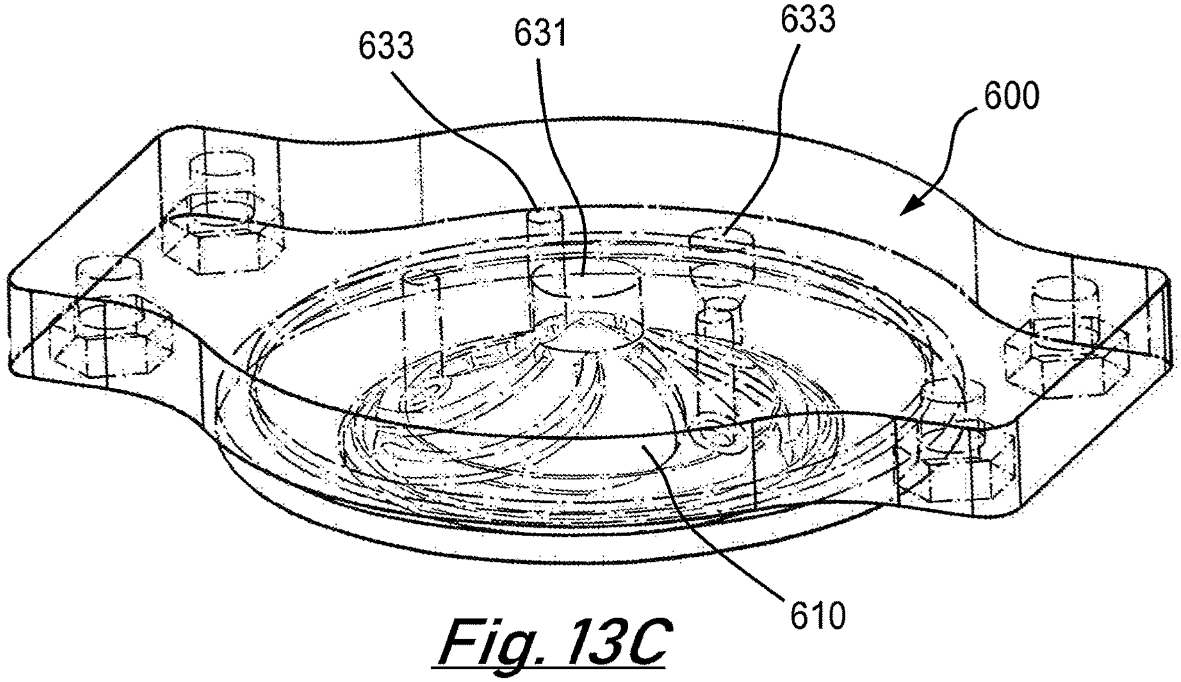

As best shown in FIG. 13C, the dispenser head manifold 630 has apertures for beverage inlet 631 and gas inlet/outlet connections 633. The beverage port 631 is in fluid communication with a nozzle 610 located in the dispenser head manifold.

Figure 13E:
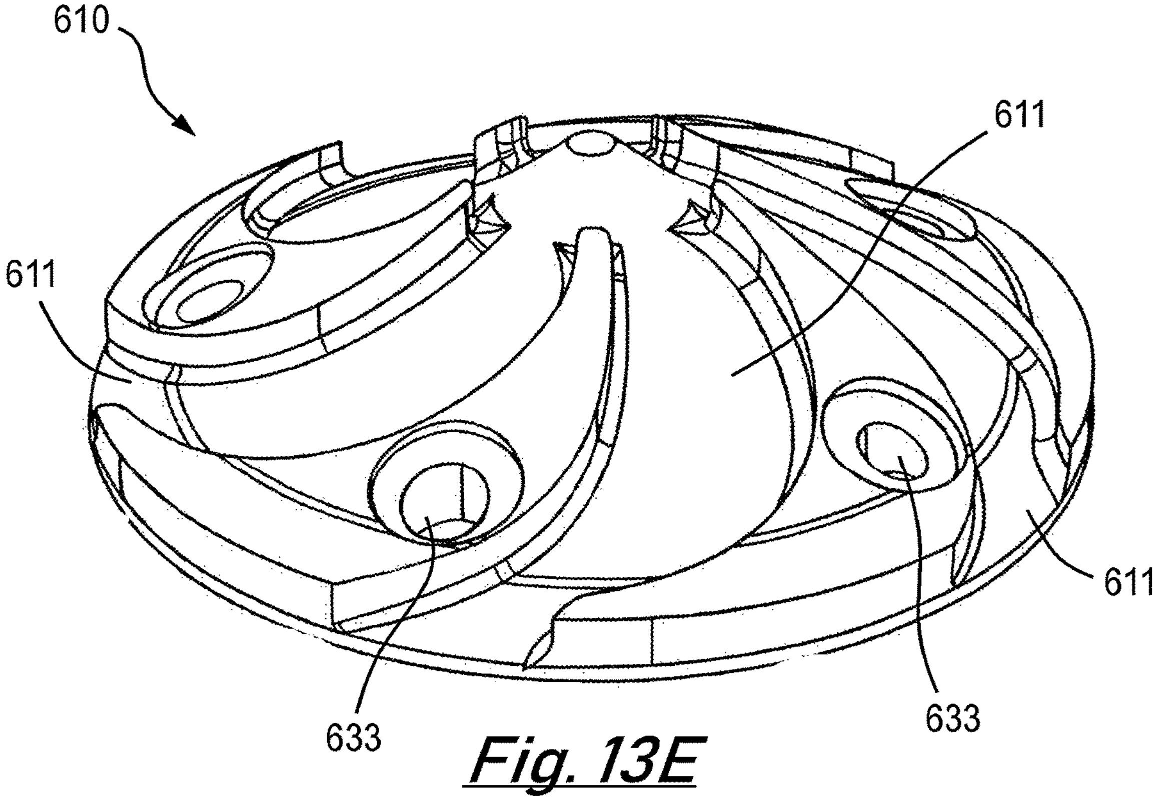
FIG. 13E is a perspective view of a nozzle used in the sealing plate of FIGS. 13A to 13C.

The nozzle 610, as best shown in FIG. 13E has a generally conical shape with a plurality of curved flow channels 611 that direct the beverage in various spiraling directions projecting radially from the beverage inlet (preferably creating a swirling motion to reduce foaming). Beverage exiting the nozzle is directed against the internal sides of the container 618 while it is dispensed. The curved flow channels 611 have a decreasing cross-section towards the channel exit.

Incorporating both the sealing element 634 and nozzle 610 in the dispenser head manifold 630 allows the manifold 630 to be more compact and allows for a wide range of container dimensions to be used.

Figure 13D:
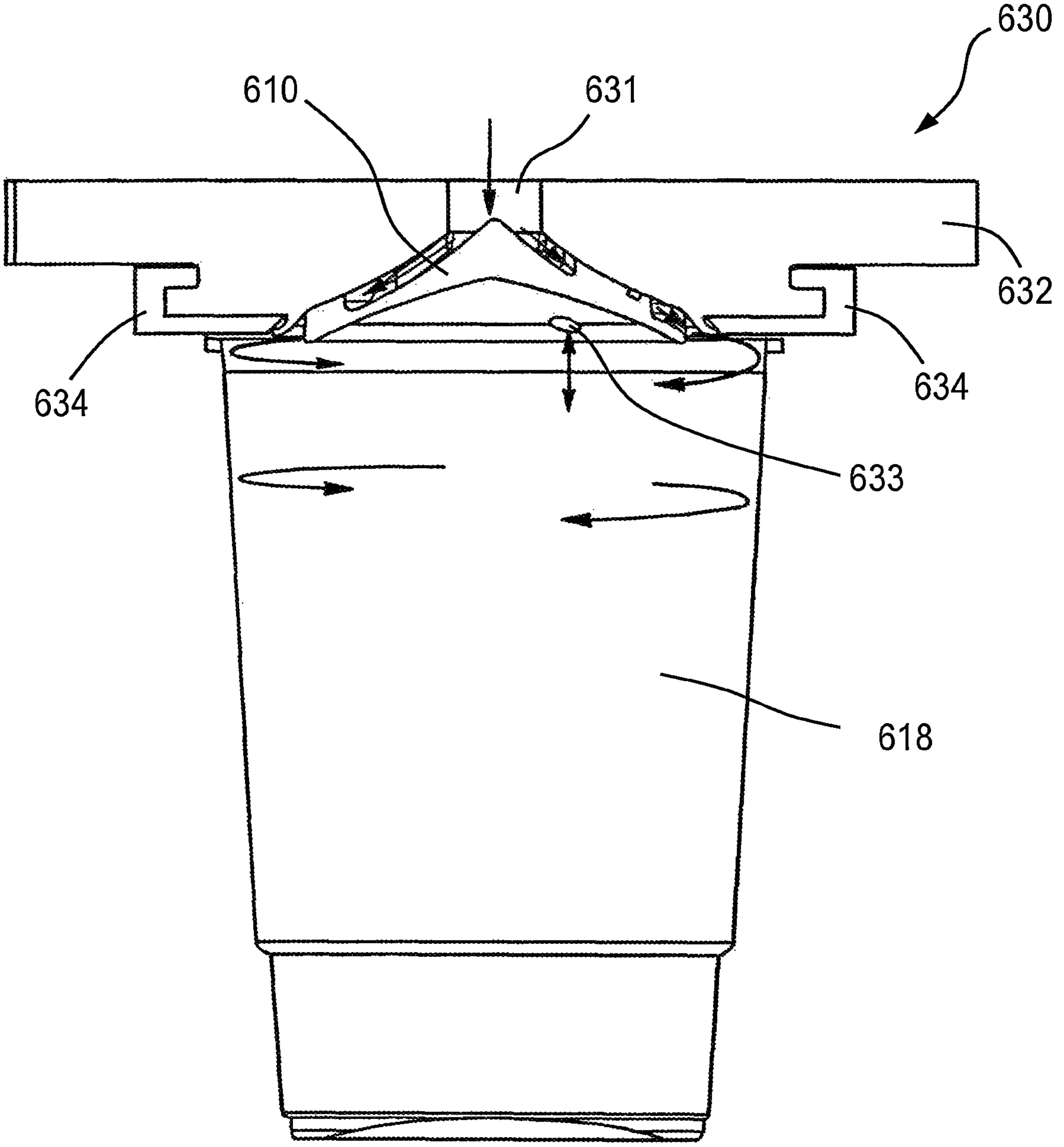

FIG. 13D shows the beverage fluid path (shown by arrows) as it comes out of the beverage port through the nozzle and into the container 618. The fluid flow is split into several spiraling flow paths by the channels in the nozzle 610. The internal curved profiles and decreasing cross-sectional area of the channels directs the beverage against all internal sides of the container at an angle range of +15 degrees (to cup rim) to −45 degrees (to cup base) to the horizontal plane.

The centrifugal force acting on the beverage caused by the curved profiles and decreasing cross-sectional area of nozzle 610 allows for the beverage to move around and cover the internal surface area of the container. This allows for the beverage to reach the bottom of the container as quickly as possible with minimum turbulence and with a greater volumetric flow rate. This process also reduces the distance that the product drops down the container and thus reduces turbulence.

The nozzle is protected by the sealing plate from contact with foreign objects or customers improving the hygiene of the dispenser. The nozzle and sealing element may also be removed from the dispenser head manifold to allow easy cleaning.

The nozzle design avoids the need for a dip tube and can therefore be used in substantially dispenser designs such as bar top units.

Figure 14:
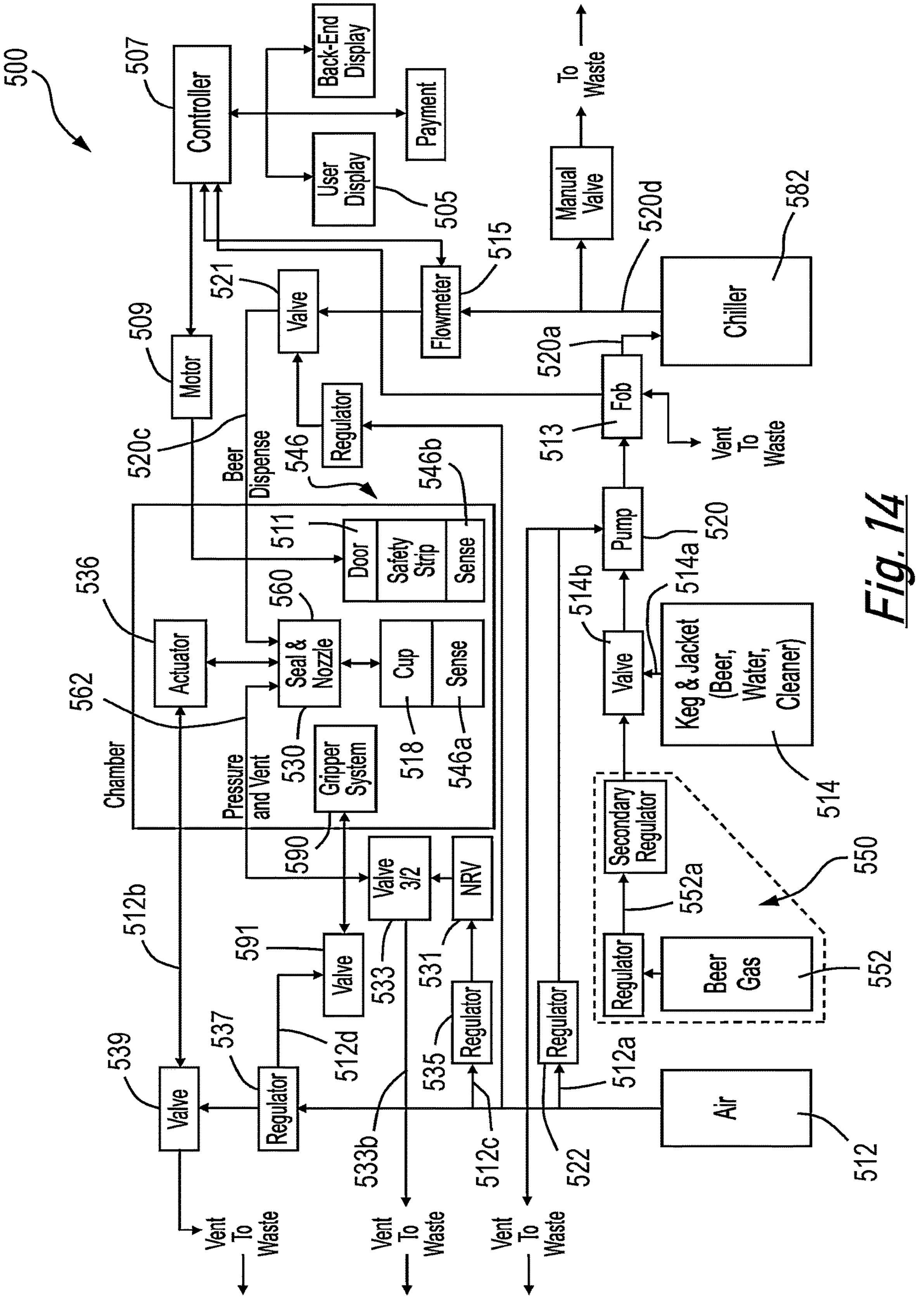
FIG. 14 is a schematic diagram of the circuit of the dispenser system of FIG. 10A.

FIG. 14 shows a pressure and flow circuit for the beverage dispenser system according to an embodiment of the invention.

The circuit 500 includes an air supply 512 and a beverage source 514. The air supply 512 has a four flow lines 512*a*, 512*b*, 512*c* and 512*d*. Flow line 512*a* is connected via a regulator 522 to a fluid pump 520. Flow line 512*a* is configured to actuate the fluid pump 520.

Flow line 512*b* is connected to actuator 536 via a regulator 537 and valve 539. The actuator is configured to pneumatically control the actuation and movement of the dispenser head 530.

Flow line 512*c* is connected to a pressure port 562 on the dispenser head 530 via regulator 535, 3-way valve 533 and check valve 531. The purpose of the pressured air delivered to the pressure port 562 is to create a counter pressure in the container 518 which allows for the rapid dispensing of a beverage into the container 518 without gas breakout from the beverage solution which would result in excessive foam or bubble formation.

In this example the pressurised air is used as a pneumatic energy source for unit operation (6 Bar pressure). However, it will be appreciated that mechanical, electrical and/or hydraulic systems could also perform this function.

Flow line 512*d* is connected to an actuator in the gripper system 590 via a regulator 537 and valve 591. The gripper system 590 is configured to grip and support the container 518 during beverage dispensing.

Flow lines 512*a* to 512*d* are connected to a 'ring main' which allows each path to equally draw the required air pressure to operate. A pressure release valve is included in the circuit to provide a means of safely depressurising the pneumatic system.

The beverage source 514, such a pressurised keg, is connected to flow line 514*a*. In this example the beverage source is an 11-gallon pressurised beer keg. Flow line 514*a* is connected to pump 520 via a valve 514*b*. Pump 520 is configured to pump a beverage from the beverage source 514 to a container 518 via a beverage port 560 on the dispenser head 530.

In use, a user selects a beverage on a display 505 connected to a controller unit 507. The user may insert a container into the container support (not shown) or the device automatically releases a container into the container support (not shown). The controller unit 507 actuates motor 509 to lower a splashguard or close the safety door 511.

Before the dispense cycle commences, the controller unit 507 checks the status of the safety system 546 which includes checking the container sensor 546*a* to confirm that a container 518 is present and checking the status of the screen/splashguard safety switch 546*b* to confirm that the screen/splashguard is closed, or the splash guard is in place. If either sensor reports a negative value, the dispense cycle stops and waits for the user to correct the error.

Upon a positive signal from the safety systems, the controller unit 507 opens valve 591 to activate the gripper system 590 to move the grabber supports to grip the container. The controller unit 507 opens valve 539 to activate actuator 536 to move the dispenser head 530. The dispenser head 530 is lowered towards the container 518 causing the manifold sealing plate and sealing element 532 to form a sealing barrier with the container 518. Once a seal has been made, the control unit actuates valve 533 to open the pathway between the air supply 512 and the outlet on the dispenser manifold. Pressurised air then fills the container. Valve 533 is an air powered, electrically operated valve.

The controller unit 507 controls the pressure at which air injection is stopped. The pressure level is adjustably set by an electronically or manually controlled regulator. The pressure may range from 0.4 Bar up to the maximum pressure rating of the container which is potentially in excess of 5 Bar.

A pressure sensor (not shown) located within the dispenser head 530 monitors the internal pressure of the container 518 to confirm that the seal has held the applied counter-pressure. In the event of a failure to build up to the required counter-pressure within a pre-determined period, the control unit halts the dispense cycle. A digital display situated close to the counter pressure manifold may provide a real-time pressure level of counter-pressure in the container 518.

If the container 518 successfully holds the required counterpressure, a signal is sent to open valve 521 and actuate pump 520. Beverage is transported from the beverage source to the dispensing head as a result of gas pressure in the pressurised key and/or by liquid transport pump 520. The pump 520 is an optional feature as the pipe diameter of the flowline in the system may be designed to allow flow from a high-pressure source (keg) to a low-pressure container.

The beverage is pumped from the beverage source 514 through a Foam On Beer detector (FOB) 513 through flow line 520*a* into the cooling device 582. The beverage flows along pathway 520*d* before being dispensed into container 518 via valve 521, pathway 520*c*, the dispenser head 530 and beverage inlet port 560.

The pump 520 is 90 cc/stroke air-powered pump. However, it will be appreciated that different capacity pumps may be utilised. As an example, a 568 cc (1 pint) or more per stroke pump powered pneumatically, hydraulically or electrically may be used.

The cooling device 582 is designed to cool the beverage to the optimum desired temperature for consumption. In a typical manifestation, the cooling device comprises tubes coiled within a refrigerated liquid/ice bank. The flow lines in the cooling device are preferably vacuum insulated and actively cooled lines. The number and length of coils are selected to ensure the optimum rate and magnitude of cooling to provide a consistent target beverage outlet temperature. Alternatively, or additionally the cooling process may be dynamically controlled by the controller unit 507 to maintain desired beverage temperatures at different dispense rates. The cooling device may be placed inside or outside the body of the dispenser device.

Flow, pressure and/or temperature sensors can be deployed along flow line 520*a*, 520*c* and/or 520*d* to facilitate monitoring of beverage flow conditions. All pipes and flow lines described above are may be fixed or flexible and are formed from materials which are approved for use in food and drink environments such as food-grade plastic or stainless steel.

The pump 520 will continue to pump beverage until the control unit closes valve 521 which de-actuates pump 520 after a pre-programmed elapsed time. Alternatively, or additionally a flowmeter 515 may be provided in flowlines 514*a*, 520*a*, 520*c* or dispenser head 530 to measure that the required volume of beverage has been dispensed or a sensor recognises that beverage level in the container has reached the required level.

During the pumping of beverage, the addition of the beverage into the pressurised container increases the internal pressure of the container 518. The 3-way valve 533 is set with a threshold vent value. When the internal pressure level in the container exceeds this threshold pressure value, pressured air from the container is released by valve 533 through the pressure port 562 along vent pathway 533*b* until the desired internal pressure level is again reached.

As the container 518 is filled, the volume of pressurised air in the container is displaced by beverage and the pressurised air is vented through pathway 533*b*.

The beverage is dispensed into the container rapidly during the dispense cycle. If the beverage is carbonated foaming is mitigated or minimised as the counter-pressure in the container during dispensing substantially prevents gas dissolved or mixed within carbonated beverage from coming out of solution.

Once the beverage dispensing phase is complete, the 3-way outlet value 533 is switched to open vent pathway 533*b* by the control unit. The counter-pressure provided by the pressurised air, along with any excess beverage in the container, is vented through pathway 533*b* to a waste receptacle. Subsequently or simultaneously the controller actuates the actuator 536 to lift the dispense manifold away from the container 518 breaking the sealing barrier between the sealing plate and the container. The controller actuates the gripper system to open the grippers.

Once the dispense manifold 530 is withdrawn, the safety screen or splashguard 430 may be automatically opened by motor 509 to allow the user to access the dispensed beverage. Alternatively, once the dispense manifold 530 is withdrawn, the safety screen or splash guard 430 may be manually opened allowing the operator to retrieve the filled container 518.

The circuit 500 may be modified to accommodate different beverage types or dispenser systems.

For example, if a beverage is stored in a non-pressured vessel or the pressure in the beverage source 514 is not sufficient to reach the pump 520, a separate beverage pressure system 550 may be used, as shown in dotted lines in FIG. 14. The beverage pressure source 552 is connected to valve 514*b* before the pump 520. The pressure system 550 is configured to pressurise the flow line 552*a* to provide beverage from the beverage source 514 through the valve 514*b* (when open) to the pump 520. The beverage pressure source may be a pressurised gas canister, compressor tank, accumulator tank or pressurised gas bottle.

In this example the beverage pressure source is carbon dioxide, or a mixture of carbon dioxide and nitrogen. Although the beverage pressure source may alternatively be any inert gas, a mix of gases and/or clean air.

The beverage pressure source may be applied to the vessel via one or more pressure-reducing manifolds to maintain or increase the vessel pressure and/or carbonation.

Pressurised or non-pressurised vessels may include post-mix concentrates used with carbonators for carbonated soft drinks. Other beverage sources may include 'bagged' bulk containers such as Intermediate Bulk Containers (IBCs) with capacities of approximately 1 $m^3$ through to mobile tankers with capacities ranging up to 35 $m^3$.

Figure 15A:
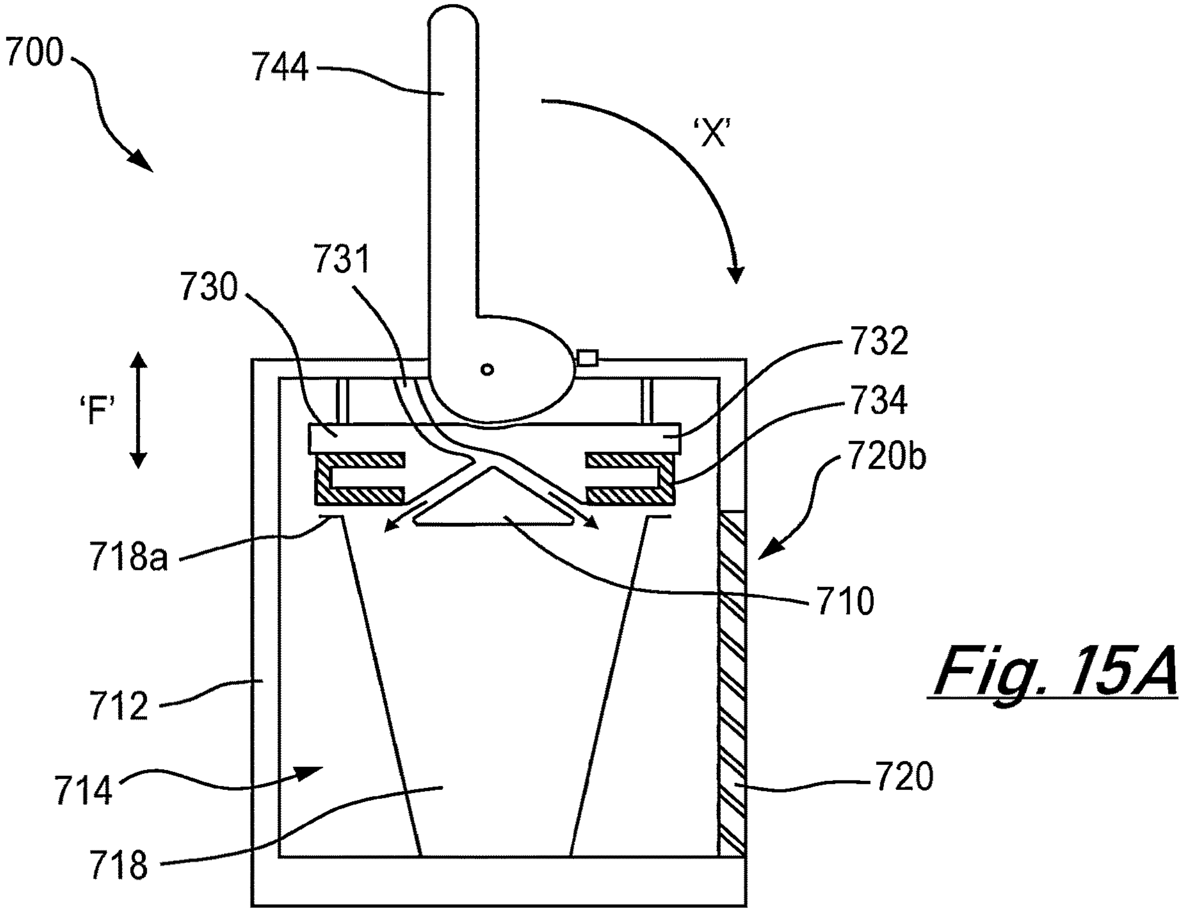
FIGS. 15A and 15B are schematic sectional views of a dispenser system in accordance with an embodiment of the invention.
Figure 15B:
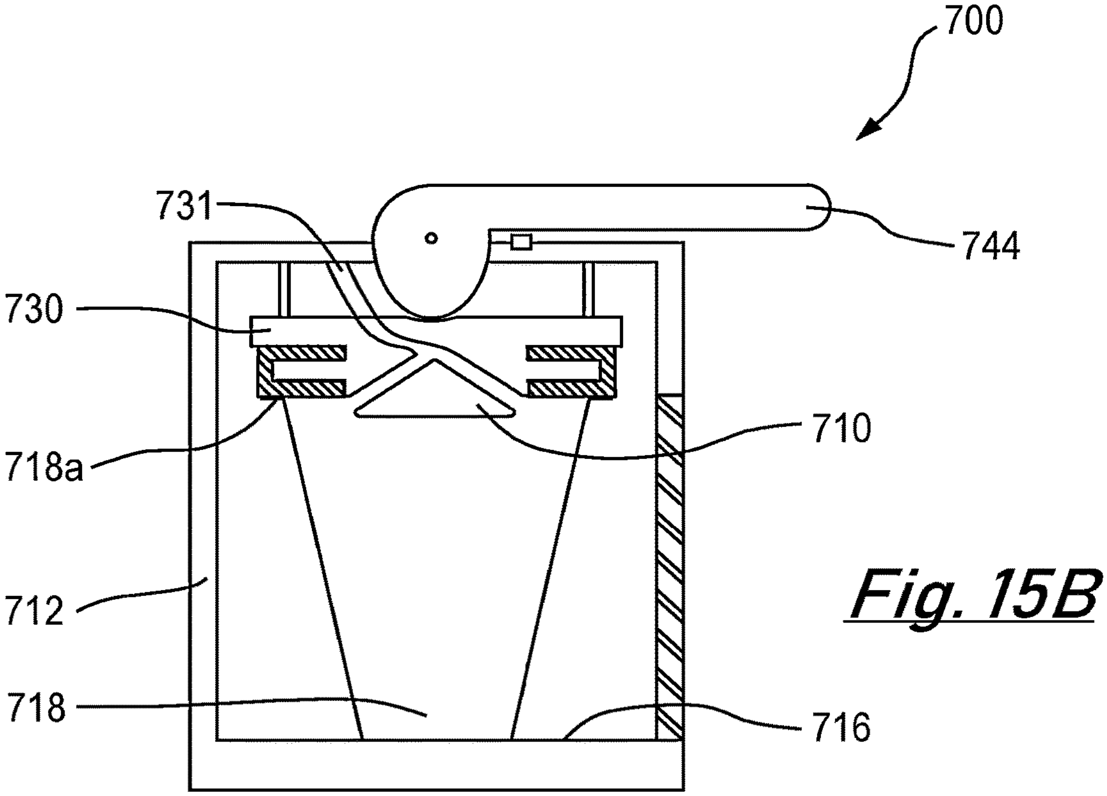

FIGS. 15A and 15B shows a dispenser assembly 700. The assembly has a main dispenser body 712. The dispenser 700 has a container base support 716. The support 716 is configured to retain and support a container 718 for dispensing a beverage under pressure into the container. Although in FIG. 15 only one dispenser 714 is shown, the system may comprise a plurality of dispensers in main dispenser body 712.

The main dispenser body 712 has an opening 720*b* which allows the insertion and removal of the container from the assembly 700. In this example a door is pivotally mounted on the dispenser body 712. The door 720 has a window 720*a* to allow the filling of the container to be monitored and to protect the user during dispensing.

The assembly 700 has a dispenser head manifold 730 which is designed to be lowered and raised in a vertical direction along arrows "F" relative to the upper edge or rim 718*a* of the container 718. The dispenser head 730 comprises a sealing plate 732 which has a sealing element 734 on a section of the sealing plate 732.

The dispenser 700 may optionally comprise ribs or supports configure to position or align the container with the dispenser head.

The dispenser head manifold 730 is lowered and raised by a clamping mechanism. In this example a cam lever 744 is pivotally mounted on the main dispenser body 712. In a first lever position shown in FIG. 15A the lever is not acting on the dispenser head manifold 730. In this unlocked position a container can be inserted and removed from the assembly. When the lever is pivoted in a direction shown as arrow X in FIG. 15A to second lever position, the cam lever acts on the dispenser head manifold 730 moving it on a downward direction. In this locked position the dispenser head manifold 730 is lowered onto the container and the sealing element 734 forms a seal with the container.

The sealing element 734 is designed to maintain a pressure differential between the interior and exterior of the container when a seal is formed. By providing a pressure differential between the interior and exterior of the container a counter pressure may be used to dispense the beverage into the container rapidly without excessive foaming. The dispenser head manifold 730 has apertures for beverage port 731 and gas inlet/outlet connections. The beverage port 631 is in fluid communication with a nozzle 710 located in the dispenser head manifold. The nozzle 710 is similar to the nozzle 610 described in FIGS. 13A to 13E and will be understood from the description of FIG. 13A to 13E.

In the above example the dispenser assembly 700 has a container base support. However, alternatively or additionally the assembly may comprise at least one support to support the mouth, lip, rim and/or side of the container.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

Furthermore, relative terms such as", "lower", "upper, "up", "down", above, below and the like are used herein to indicate directions and locations as they apply to the appended drawings and will not be construed as limiting the invention and features thereof to particular arrangements or orientations. Likewise, the term "outlet" or "exit" shall be construed as being an opening which, dependent on the direction of the movement of fluid may also serve as an "inlet" or "entry", and vice versa.

In the above examples the apparatus has a dip tube connected to the beverage inlet port which is an optional feature. The dip tube may be of varying length, straight and/or angled to the side of the container. An advantage of a dip tube is that it reduces turbulence in the container during beverage dispensing.

The above examples describe the beverage system dispensing into a plastic disposable cup. However, the beverage system may also be used to dispense into any type of beverage container including bottles, mugs, cups, jugs, glasses, beakers, tumblers or tankards. The container may be made from a range of materials including hard or soft plastic, glass, ceramic, cardboard, paper, waxed paper or foam. The container may be disposable or reusable.

However, a beverage may be dispensed into the container without a dip tube or by using a nozzle instead of a dip tube. These arrangements may reduce the required vertical travel of the dispenser head manifold. This would have the benefit of reducing the travel distance of the dispense manifold thereby shortening the dispense cycle time.

In an embodiment of the invention the dispenser may comprise a payment system. The control unit may be connected to a device that takes and accepts payment before permitting dispense to take place or alternatively does not release the beverage until payment has taken place. Instructions from users may include the number of beverages required or a particular dispense customisation required (e.g. temperature/foam 'head' height).

Instructions issued by the dispenser apparatus to users may include instructions how to pay or present the beverage container. Payment may be via cash, payment cards or payment 'apps'.

In the above examples, the pressure port on the sealing plate has two functions. The pressure port is used as an inlet to pump air into the container to provide a counter-pressure. The pressure port is also used a vent outlet for gases and waste products. In an alternative design the sealing place may have two separate ports for these functions. The invention provides a system for dispensing a beverage into a container comprising at least one dispenser unit. The dispenser unit comprises at least one support member configured to support the container and a dispenser head. The dispenser head comprises a beverage outlet, at least one pressure port and a moveable seal member which is configured to form a sealing barrier between at least a portion of the container and the dispenser head.

By providing a system comprising a moveable seal member which is configured to form a sealing barrier between at least a portion of the container and the dispenser head, the position of the container is not changed during the formation of the seal, the dispensing of the beverage and the release of the seal. This may prevent or mitigate agitation of the beverage in the container allowing a quicker beverage settling time or mitigate excessive foaming.

This system also mitigates movement of the container which may avoids spillage of the beverage once it has been dispensed.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention herein intended.

The invention claimed is:

1. A method of dispensing a beverage into a container, the method comprising:

providing a beverage dispenser system comprising at least one dispenser unit, the at least one dispenser unit comprising:

a dispenser body;

at least one support member mounted on the dispenser body; and a dispenser head, wherein the dispenser head comprises:

at least one fluid port; and a seal member;

wherein the at least one support member is configured to contact and support the container at a lip and/or a rim of the container and to align the lip and/or rim of the container with the seal member;

contacting the at least one support member with a lip and/or rim of the container;

moving the seal member to contact a lip and/or rim of the container to form a seal between the dispenser head and the container;

holding the container stationary throughout the formation of the seal;

pressurising an interior volume of the container with a pressurised fluid; and pumping the beverage into an interior volume of the container through the at least one fluid port, wherein the seal member is configured to maintain the seal while the beverage is pumped into the container.

2. The method according to claim 1 comprising holding the container stationary throughout pressurising of the container and/or pumping of the beverage.

3. The method according to claim 1, wherein the at least one support member is configured to provide support to the lip or rim of the container that opposes a force applied to the container when the seal member is moved to contact at least a portion of the container to form a seal between the dispenser head and the container.

4. The method according to claim 1 comprising forming a differential pressure between an internal and external volume of the container when the seal between the dispenser head and the container is formed.

5. The method according to claim 1 comprising increasing pressure in the container above atmospheric pressure prior to pumping the beverage into the container.

6. The method according to claim 1 comprising dispensing the beverage under counterpressure.

7. The method according to claim 1 comprising venting or removing pressurised fluid from the interior volume of the container while the beverage is pumped into the container and/or after the beverage has been pumped into the container.

8. The method according to claim 1 comprising lowering the seal member onto at least a portion of the container.

9. The method according to claim 1 comprising moving the dispenser head to contact the seal member with a rim, upper edge or inner edge of the container to form a seal between the dispenser head and the container.

10. The method according to claim 1 comprising moving the seal member between a first condition in which the seal member is spaced from the container and/or the at least one support member and a second condition in the seal member is in contact with at least a portion of the container and/or the at least one support member to form a seal.

11. The method according to claim 1 comprising moving the seal member and/or dispenser head relative to the at least one support member.

12. The method according to claim 1 comprising moving the seal member relative to the dispenser head to contact at least a portion of the container to form a seal.

13. The method according to claim 1 wherein the sealing member contacts, grips and/or clamps an inner, outer or upper surface of the mouth, lip and/or rim of the container.

14. The method according to claim 1 comprising reducing an internal pressure of the container to atmospheric pressure during or after pumping the beverage into the container.

15. The method according to claim 1 comprising moving the seal member away from the rim, upper edge or inner edge of the container to break the seal between the dispenser head and the container after the beverage is pumped into the container.

16. The method according to claim 1 comprising dispensing the beverage into the container in less than 5 seconds.

17. The method according to claim 1 comprising supporting the container at the mouth, lip, rim, side and/or base of the container.

18. A method of dispensing a beverage into a plurality of containers, the method comprising:

providing a beverage dispenser system comprising plurality of dispenser units, wherein each dispenser unit comprises:

at least one support member mounted on a body of the dispenser unit; and a dispenser head, wherein the dispenser head comprises:

at least one fluid port; and a seal member;

wherein the at least one support member is configured to contact and support the container at a lip and/or a rim of the container and to align the lip or rim of the container with the seal member;

positioning a first container on a first dispenser unit;

contacting the at least one support member with the lip and/or rim of the container;

moving the seal member to contact the lip and/or rim of the first container to form a seal between the dispenser head and the first container;

holding the container stationary throughout the formation of the seal;

pressuring an interior volume of the first container; and pumping the beverage into the interior volume of the first container through the at least one fluid port, wherein the seal member is configured to maintain the seal while the beverage is pumped into the container.

19. The method according to claim 18 further comprising:

positioning a second container on a second dispenser unit;

moving the seal member to contact at least a portion of the second container to form a seal between the dispenser head and the second container;

pressuring an interior volume of the second container; and pumping the beverage into the interior volume of the second container through the at least one fluid port.

20. The method according to claim 18 further comprising dispensing a beverage into a second container using a second dispenser unit subsequently or simultaneously to the first dispenser unit dispensing into the first container.

21. The method according to claim 18, wherein the at least one support member is configured to provide support to the lip or rim of the first container that opposes a force applied to the first container when the seal member is moved to contact at least a portion of the first container to form a seal between the dispenser head and the container.

* * * * *